US010755496B2

(12) United States Patent
Ohno

(10) Patent No.: US 10,755,496 B2
(45) Date of Patent: Aug. 25, 2020

(54) VEHICLE DIAGNOSTIC SYSTEM, VEHICLE DIAGNOSTIC METHOD, AND DIAGNOSTIC DEVICE

(71) Applicant: HONDA MOTOR CO., LTD., Tokyo (JP)

(72) Inventor: Tetsuya Ohno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 15/627,623

(22) Filed: Jun. 20, 2017

(65) Prior Publication Data

US 2017/0372536 A1 Dec. 28, 2017

(30) Foreign Application Priority Data

Jun. 23, 2016 (JP) ................................ 2016-124104
Jun. 23, 2016 (JP) ................................ 2016-124113

(51) Int. Cl.

| | |
|---|---|
| ***G01M 17/00*** | (2006.01) |
| ***G06F 7/00*** | (2006.01) |
| ***G07C 5/08*** | (2006.01) |
| *B60L 3/00* | (2019.01) |
| *B60L 15/00* | (2006.01) |
| *G05D 1/00* | (2006.01) |
| *G05D 3/00* | (2006.01) |
| *G06F 17/00* | (2019.01) |

(52) U.S. Cl.

CPC ........... *G07C 5/0858* (2013.01); *G07C 5/085* (2013.01); *G07C 5/0808* (2013.01); *G07C 5/0825* (2013.01); *G07C 2205/02* (2013.01)

(58) Field of Classification Search

CPC .. G07C 5/0858; G07C 5/0808; G07C 5/0825; G07C 2205/02; G07C 5/008; G06F 17/00
USPC .................. 701/33.3, 31.5, 33, 35, 21, 31.4
See application file for complete search history.

(56) References Cited

U.S. PATENT DOCUMENTS 8,825,275 B2 9/2014 Hoshino et al.
2006/0184295 A1* 8/2006 Hawkins ............... G07C 5/008 701/31.4

(Continued)

FOREIGN PATENT DOCUMENTS

JP 2013-170986 A 9/2013
JP 2015-229363 A 12/2015

(Continued)

OTHER PUBLICATIONS

Apr. 9, 2019 Office Action issued in Japanese Patent Application No. 2016-124113.

*Primary Examiner* — Mahmoud S Ismail
(74) *Attorney, Agent, or Firm* — Squire Patton Boggs (US) LLP

(57) ABSTRACT

A diagnostic device, in accordance with a marker condition setting function, sets marker conditions for adding markers to collected data. Next, the collected data are read out from a data collecting device. Next, in accordance with a marking function, markers are added to the collected data at points in time when the set marker conditions are satisfied. Then, in accordance with a file creation function, with reference to the markers of the collected data, the collected data that took place within a predetermined time range before and after the markers is extracted, and the collected data is stored in individual analysis files.

13 Claims, 23 Drawing Sheets

(56) References Cited

U.S. PATENT DOCUMENTS

| | | | | |
|---|---|---|---|---|
| 2012/0271506 | A1* | 10/2012 | Hoshino | G05B 23/0275 701/31.4 |
| 2014/0371977 | A1* | 12/2014 | Sumi | G01M 17/007 701/31.5 |
| 2016/0140393 | A1* | 5/2016 | Schneider | G06K 9/00671 382/103 |

FOREIGN PATENT DOCUMENTS

| | | | |
|---|---|---|---|
| WO | 2011055542 | A1 | 5/2011 |
| WO | 2011055542 | A1 | 12/2011 |

* cited by examiner

10

220

230

VEHICLE DIAGNOSTIC SYSTEM, VEHICLE DIAGNOSTIC METHOD, AND DIAGNOSTIC DEVICE

CROSS-REFERENCE TO RELATED APPLICATIONS

This application is based upon and claims the benefit of priority from Japanese Patent Applications No. 2016-124104 filed on Jun. 23, 2016 and No. 2016-124113 filed on Jun. 23, 2016, the contents all of which are incorporated herein by reference.

BACKGROUND OF THE INVENTION

Field of the Invention

The present invention relates to a vehicle diagnostic system, a vehicle diagnostic method, and a diagnostic device, in which driving parameter data of a vehicle are collected by a data collecting device, and the collected vehicle parameter data are analyzed by the diagnostic device.

Description of the Related Art

In the event that abnormal conditions or symptoms are generated during driving of a vehicle, notification to a user is performed through warnings, by illuminating a warning lamp or the like that is provided on an instrument panel. Together with such abnormal symptoms or the warnings that accompany the same, the user brings the vehicle to a dealer or a repair facility where diagnostic operations or repairs on the vehicle are carried out.

An operator (a technician or the like) in charge of the repairs connects a fault diagnostic device to an electronic control unit (hereinafter referred to as an "ECU") of the faulty vehicle, and by reading out information that is stored in the ECU concerning fault codes, etc., at the time that the fault occurred, abnormal systems (electrical circuits in which a fault is taking place) can be identified relatively easily.

However, in spite of the fact that complaints from the user concerning faulty conditions may exist, cases occur in which there is no record of failure codes for such abnormalities. Further, responsive to the complaint, cases occur (so-called problematic repairs) in which the faulty condition cannot be reproduced even though the technician handling the repair attempts to do so, and hence repair of the vehicle is quite difficult to carry out.

With respect to such problematic repairs, for example, as disclosed in Japanese Laid-Open Patent Publication No. 2013-170986 and Japanese Laid-Open Patent Publication No. 2015-229363, a large capacity storage device (also referred to as a "data collecting device" or a "data logger") is temporarily attached to the ECU of the subject vehicle, and the user is made to drive the vehicle over several days. In addition, data (driving parameter data) required for the fault diagnosis are collected and accumulated in the storage device, and detailed diagnostics are carried out by investigating the collected data using a failure diagnostic device or a failure analysis device.

SUMMARY OF THE INVENTION

The devices illustrated in Japanese Laid-Open Patent Publication No. 2013-170986 and Japanese Laid-Open Patent Publication No. 2015-229363 collect driving parameter data over several days. Accompanying lengthening of the data collection period, the amount of driving parameter data becomes enormous. In order to analyze such an enormous amount of driving parameter data, even for a skilled worker, an enormous amount of effort and a large number of steps (man-hour) are required to analyze such data.

The present invention has been devised in consideration of the aforementioned problems, and has the object of providing a vehicle diagnostic system, a vehicle diagnostic method, and a diagnostic device, in which the amount of effort and man-hour required to analyze driving parameter data collected by a data collecting device can be reduced.

A vehicle diagnostic system according to the present invention is a vehicle diagnostic system including a vehicle diagnostic data collecting device configured to, in a state of being detachably connected from the exterior to an in-vehicle network having a plurality of electronic control units, transmit a data request signal for requesting driving parameter data indicative of operating states of respective components of a vehicle, to at least one target electronic control unit from among the plurality of electronic control units, receive the driving parameter data corresponding to the data request signal, and store the driving parameter data as collected data in association with a time axis, and a diagnostic device configured to perform a diagnosis of the vehicle based on the collected data stored in the data collecting device. The diagnostic device includes a storage unit configured to, for each of symptoms to be diagnosed, store beforehand a driving parameter related to the symptom, and a judgment condition of the driving parameter, in association with each other, a marker condition setting unit configured to select one from among the symptoms stored in the storage unit, and set a judgment condition of the driving parameter associated with the selected symptom as a marker condition for adding a marker to the time axis of the collected data, a marking unit configured to add the marker to a point in time when the marker condition is satisfied, and a data extraction unit configured to extract the collected data that took place within a predetermined time range before and after the marker.

According to the present invention, when analyzing a large amount of driving parameter data collected by the data collecting device, with reference to information of malfunctions obtained from a user of a faulty vehicle and/or assuming in advance the driving conditions desired to be checked, by setting marker conditions with respect to the driving parameter data collected by the data collecting device, only data for which analysis is desired can be extracted as an analysis file of a target to be analyzed. Therefore, there is no need to check the collected data sequentially from a collection starting point, it is possible to preferentially check only the extracted portion, and the amount of effort and man-hour required for analyzing the driving parameter data can significantly be reduced.

Further, in the vehicle diagnostic system according to the present invention, the diagnostic device selects any one from among the symptoms stored in the storage unit, and a judgment condition of the driving parameter associated with the selected symptom is set as a marker condition for adding a marker to the collected data. Therefore, it is possible to easily extract driving parameter data corresponding to the selected symptom.

Further, in the vehicle diagnostic system according to the present invention, the diagnostic device extracts the collected data for each marker and stores the collected data in an analysis file, whereas the collected data stored in the data collecting device remains unchanged. Therefore, when the extracted collected data is not appropriate, and it is necessary to set markers again under different conditions, it is possible to extract the data any number of times under different conditions. Accordingly, repetitive analysis is facilitated, and it is possible to perform an efficient analysis of troublesome malfunctions.

Further, the marker condition setting unit may collate the driving parameter associated with the selected symptom with the driving parameter included in the collected data, and may set as the marker condition the judgment condition of the driving parameter for which a result of the collation matched.

In accordance with the above configuration, the driving parameters, which are stored in advance corresponding to symptoms, are collated with the driving parameters included in the collected data. Therefore, it is possible to avoid making a mistaken setting, in which the marker condition is not satisfied so that data cannot be extracted, due to setting of driving parameters not included within the collected data.

Further, a data storage unit may further be provided, which is configured to store the collected data extracted by the data extraction unit in an analysis file for each of the markers.

In accordance with the above configuration, since analysis files are created respectively for the markers, it is possible to appropriately select and analyze driving parameter data in each of the analysis files.

Further, the marker condition setting unit may be capable of independently setting the marker condition for each of the symptoms, and the data storage unit may create an analysis file group classified for each of the symptoms.

In accordance with the above configuration, since the marker conditions can be independently set for each of a plurality of symptoms, it is possible to carry out the extraction operation of the collected data in a comprehensive manner.

Further, the diagnostic device may further include a time range setting unit configured to independently set respectively, within the predetermined time range, a time range before the marker and a time range after the marker.

In accordance with the above configuration, since a time range before the marker and a time range after the marker are respectively and independently set within the predetermined time range of the collected data to be extracted, it is possible to set an appropriate time range corresponding to the circumstances of the malfunction.

A vehicle diagnostic method according to the present invention is a vehicle diagnostic method in which, by a data collecting device detachably connected from the exterior to an in-vehicle network having a plurality of electronic control units, a data request signal for requesting driving parameter data indicative of operating states of respective components of a vehicle is transmitted to at least one target electronic control unit from among the plurality of electronic control units, the driving parameter data corresponding to the data request signal is received, and the driving parameter data is stored as collected data in association with a time axis, and by a diagnostic device, diagnosis of the vehicle is performed based on the collected data stored in the data collecting device. In this case, using the diagnostic device, there are performed a storage step of, for each of symptoms to be diagnosed, storing beforehand a driving parameter related to the symptom, and a judgment condition of the driving parameter, in association with each other, a marker condition setting step of selecting one from among the symptoms stored in the storage step, and setting a judgment condition of the driving parameter associated with the selected symptom as a marker condition for adding a marker to the time axis of the collected data, a marking step of adding the marker to a point in time when the marker condition is satisfied, and a data extraction step of extracting the collected data that took place within a predetermined time range before and after the marker.

A diagnostic device according to the present invention is a diagnostic device connected to a data collecting device configured to collect driving parameter data indicative of operating states of respective components of a vehicle in a state of being connected from the exterior to an in-vehicle network having a plurality of electronic control units, and store the driving parameter data as collected data, and which performs a diagnosis of the vehicle based on the collected data stored in the data collecting device, the diagnostic device including a storage unit configured to, for each of symptoms to be diagnosed, store beforehand a driving parameter related to the symptom, and a judgment condition of the driving parameter, in association with each other, a marker condition setting unit configured to select one from among the symptoms stored in the storage unit, and set a judgment condition of the driving parameter associated with the selected symptom as a marker condition for adding a marker to the time axis of the collected data, a marking unit configured to add the marker to a point in time when the marker condition is satisfied, and a data extraction unit configured to extract the collected data that took place within a predetermined time range before and after the marker.

A vehicle diagnostic system according to the present invention is a vehicle diagnostic system including a vehicle diagnostic data collecting device configured to, in a state of being detachably connected from the exterior to an in-vehicle network having a plurality of electronic control units, transmit a data request signal for requesting driving parameter data indicative of operating states of respective components of the vehicle, to at least one target electronic control unit from among the plurality of electronic control units, receive the driving parameter data corresponding to the data request signal, and store the driving parameter data as collected data in association with a time axis, and a diagnostic device configured to perform a diagnosis of the vehicle based on the collected data stored in the data collecting device. The diagnostic device includes a marker condition setting unit configured to set a marker condition for adding a marker to the time axis of the collected data, a marking unit configured to add the marker to a point in time when the marker condition is satisfied, and a file storage unit configured to extract the collected data that took place within a predetermined time range before and after the marker, and store the collected data in an analysis file for each of the markers. The marker condition setting unit includes a parameter selection unit configured to display driving parameters included in the collected data so as to enable selection thereof, a judgment condition setting unit configured to set a judgment condition for a driving parameter selected by the parameter selection unit, and a combination condition setting unit configured to, in the event that a plurality of the driving parameters are selected by the parameter selection unit, set a combination condition for the plurality of driving parameters.

According to the present invention, when analyzing a large amount of driving parameter data collected by the data collecting device, with reference to information of malfunctions obtained from a user of a faulty vehicle and/or assuming in advance the driving conditions desired to be checked, by setting marker conditions with respect to the driving parameter data collected by the data collecting device, only data for which analysis is desired can be extracted as an analysis file of a target to be analyzed. Therefore, there is no need to check the collected data sequentially from a collection starting point, it is possible to preferentially check only the extracted portion, and the amount of effort and man-hour required for analyzing the driving parameter data can significantly be reduced.

Further, in the vehicle diagnostic system according to the present invention, when setting the marker condition, the diagnostic device displays the driving parameters included in the collected data to enable selection thereof. For example, a list of driving parameters is displayed, and among such driving parameters, driving parameters included in the collected data are normally displayed and are capable of being selected, whereas other driving parameters not included in the collected data are displayed in a grayed out fashion or the like, whereby selection thereof is disabled. Therefore, an operator can easily select driving parameters that are capable of being set.

Further, in the vehicle diagnostic system according to the present invention, the diagnostic device extracts the collected data for each marker and stores the collected data in an analysis file, whereas the collected data stored in the data collecting device remains unchanged. Therefore, when the extracted collected data is not appropriate, and it is necessary to set markers again under different conditions, it is possible to extract the data any number of times under different conditions. Accordingly, repetitive analysis is facilitated, and it is possible to perform an efficient analysis of troublesome malfunctions.

Further, the diagnostic device may further include a time range setting unit configured to respectively and independently set within the predetermined time range a time range before the marker and a time range after the marker.

In accordance with the above configuration, a time range before the marker and a time range after the marker are respectively and independently set within the predetermined time range of the collected data to be extracted. Therefore, it is possible to set an appropriate time range corresponding to the circumstances of the malfunction.

In addition, the marker condition setting unit may further include a marker number setting unit configured to set an upper limit number for the number of the markers, and the marking unit may stop the process of adding the markers, in the event that the number of the markers added to the collected data has reached the upper limit number.

With the above configuration, in the event that narrowing down by the marker conditions is insufficient, the number of markers reaches the upper limit number, whereupon the process of adding markers is stopped. More specifically, as a result of the process of adding markers being stopped, it can be grasped at an early stage that insufficient narrowing down by the marker conditions has occurred. Therefore, it becomes easier to conduct an analysis in such a manner that conditions are added to the marker conditions in a stepwise manner, and the marker conditions are gradually narrowed down.

In addition, the marker condition setting unit may further include a final judgment setting unit configured to set a final judgment parameter at which the judgment condition is determined lastly, in the event that a plurality of the driving parameters are selected by the parameter selection unit, and satisfaction of a judgment condition of the final judgment parameter, after the judgment conditions of the driving parameters excluding the final judgment parameter from among the driving parameters included in the combination condition have been satisfied, is set as a condition by which the marker condition is satisfied.

With the above configuration, in the event that judgment conditions of a plurality of driving parameters are set to the marker condition, a final judgment parameter for finally determining the judgment condition is set. In accordance with the above configuration, it is possible to extract data with reference to a point in time at which the judgment condition of the final judgment parameter has been satisfied. By setting an important driving parameter as the final judgment parameter, it is possible to extract effective collected data, even in the case that the extraction reference position within the sampling period of the collected data is affected.

Further, the diagnostic device may include a storage unit configured to store combination information of the driving parameters as a diagnostic set, for each symptom of the vehicle to be diagnosed, a diagnostic set selection unit configured to display and select an identification name of the diagnostic set, and a display control unit configured to extract from the analysis file the driving parameter data corresponding to the selected diagnostic set, and display the driving parameter data on a display unit.

In accordance with the above configuration, when diagnosing the driving parameter data stored in the analysis file, from among the driving parameters stored in the analysis file, it is possible to easily select driving parameters to be displayed for diagnosis.

A vehicle diagnostic method according to the present invention is a vehicle diagnostic method in which, by a data collecting device detachably connected from the exterior to an in-vehicle network having a plurality of electronic control units, a data request signal for requesting driving parameter data indicative of operating states of respective components of the vehicle is transmitted to at least one target electronic control unit from among the plurality of electronic control units, the driving parameter data corresponding to the data request signal is received, and the driving parameter data is stored as collected data in association with a time axis, and by a diagnostic device, diagnosis of the vehicle is performed based on the collected data stored in the data collecting device. In this case, using the diagnostic device, there are performed a marker condition setting step of setting a marker condition for adding a marker to the time axis of the collected data, a marking step of adding the marker to a point in time when the marker condition is satisfied, and a file storage step of extracting the collected data that took place within a predetermined time range before and after the marker, and storing the collected data in an analysis file for each of the markers. In the marker condition setting step, there are performed a parameter selection step of displaying driving parameters included in the collected data so as to enable selection thereof, a judgment condition setting step of setting a judgment condition for a driving parameter selected by the parameter selection step, and a combination condition setting step of setting a combination condition for the plurality of driving parameters, in the event that a plurality of driving parameters are selected by the parameter selection step.

A diagnostic device according to the present invention is a diagnostic device connected to a data collecting device configured to collect driving parameter data indicative of operating states of respective components of a vehicle in a state of being connected from the exterior to an in-vehicle network having a plurality of electronic control units, and store the driving parameter data as collected data, and which performs a diagnosis of the vehicle based on the collected data stored in the data collecting device, the diagnostic device including a marker condition setting unit configured to set a marker condition for adding a marker to the time axis of the collected data, a marking unit configured to add the marker to a point in time when the marker condition is satisfied, and a file storage unit configured to extract the collected data that took place within a predetermined time range before and after the marker, and store the collected data in an analysis file for each of the markers, and the marker condition setting unit includes a parameter selection unit configured to display driving parameters included in the collected data so as to enable selection thereof, a judgment condition setting unit configured to set a judgment condition for a driving parameter selected by the parameter selection unit, and a combination condition setting unit configured to, in the event that a plurality of driving parameters are selected by the parameter selection unit, set a combination condition for the plurality of driving parameters.

According to the present invention, by setting marker conditions with respect to the driving parameter data collected by the data collecting device, only data for which analysis is desired can be extracted as an analysis file of a target to be analyzed. Therefore, the amount of effort and man-hour required for analyzing the driving parameter data can significantly be reduced.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A. First Embodiment

[1. Configuration]

(1-1. Overall Configuration)

Figure 1:
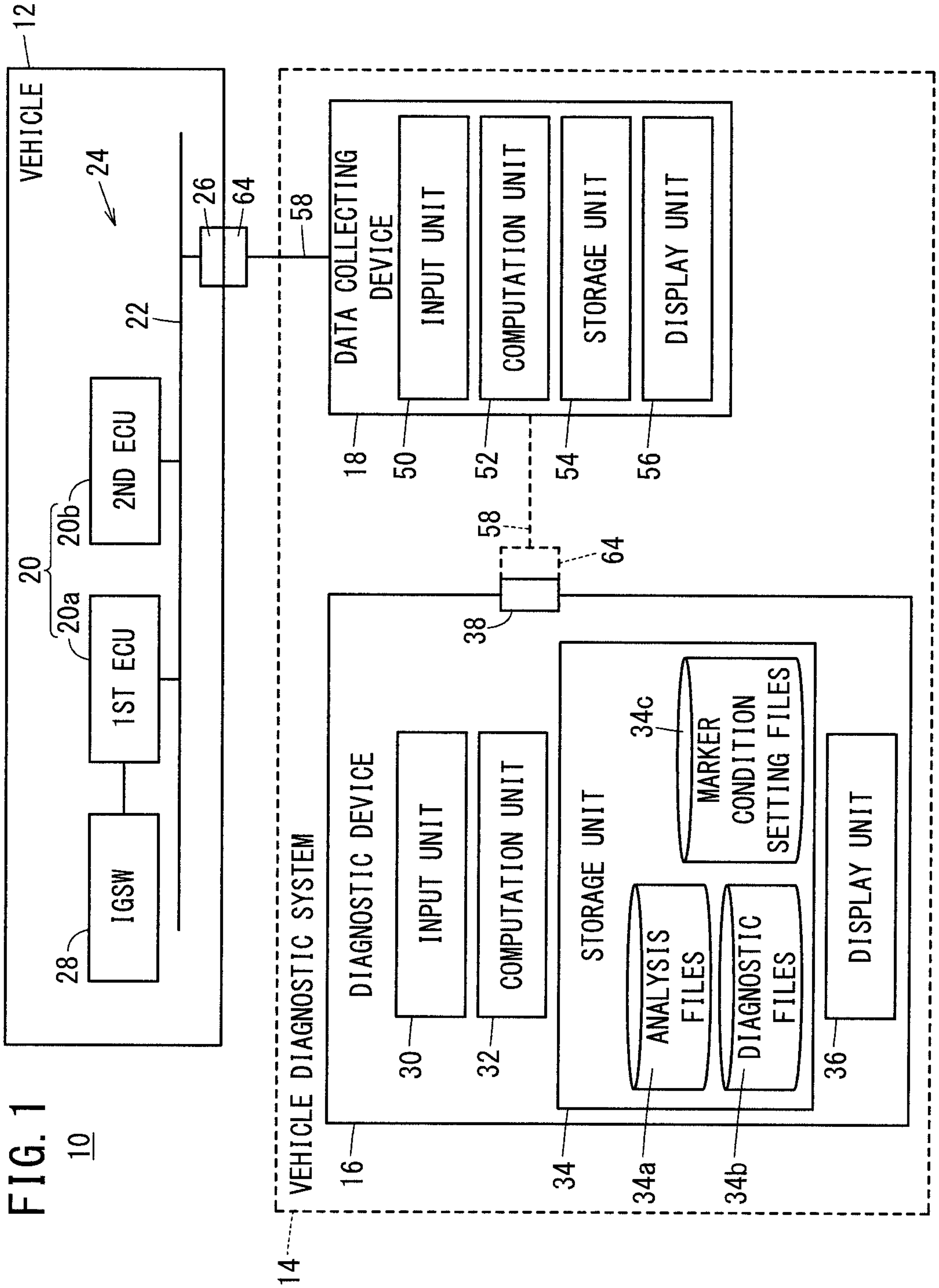
FIG. 1 is a block diagram showing a schematic configuration of an entire system representing the entirety of components needed to perform a vehicle diagnosis.

FIG. 1 is a block diagram showing a schematic configuration of an entire system 10 representing the entirety of components needed to perform a vehicle diagnosis, including a vehicle 12 and a vehicle diagnostic system 14 according to an embodiment of the present invention.

(1-2. Vehicle 12)

The vehicle 12 of the present embodiment is a four-wheeled vehicle in the form of a hybrid vehicle having a driving engine and a propulsive motor (neither of which are shown). Alternatively, the vehicle 12 may be a gasoline vehicle having only the engine and not the propulsive motor, an electric vehicle (including a fuel cell vehicle) or the like. Further, the vehicle 12 may be a vehicle in the form of a two-wheeled or three-wheeled motorcycle.

The vehicle 12 includes a plurality of electronic control units 20*a*, 20*b*, . . . (hereinafter referred to as "first and second ECUs 20*a*, 20*b*, . . . " or "ECUs 20*a*, 20*b*", and referred to collectively as "ECUs 20") for controlling the vehicle 12. In FIG. 1, to simplify the drawing, only two ECUs 20*a* and 20*b* are shown. The number of ECUs 20, for example, can be any number ranging from two to several hundred.

As examples of such ECUs 20, there can be offered, for example, an engine electronic control unit (hereinafter referred to as an "engine ECU"), a motor electronic control unit (hereinafter referred to as a "motor ECU"), a vehicle stability assist electronic control unit (hereinafter referred to as a "VSA ECU"), an antilock brake system electronic control unit (hereinafter referred to as an "ABS ECU"), an electric power steering electronic control unit (hereinafter referred to as an "EPS ECU"), a battery electronic control unit (hereinafter referred to as a "battery ECU"), a meter electronic control unit (hereinafter referred to as a "meter ECU"), an air conditioner electronic control unit (hereinafter referred to as an "air conditioner ECU"), a supplemental restraint system electronic control unit (hereinafter referred to as an "SRS ECU"), and an immobilizer electronic control unit (hereinafter referred to as an "immobilizer ECU"), etc.

The respective ECUs 20 each include an input/output unit, a computation unit, and a storage unit, none of which are shown. Further, the respective ECUs 20 are connected through a communications bus 22, and constitute an in-vehicle network 24. In the present embodiment, the in-vehicle network 24 is an F-CAN (Controller Area Network) or a B-CAN network. Alternatively, the principles of the present invention can be applied to other networks apart from the aforementioned in-vehicle network 24, such as a K-LINE network, a local interconnect network (LIN), FlexRay, and the like. The communications bus 22 includes a data link connector 26 (for example, a USB connector) provided inside a vehicle cabin or passenger compartment. Devices external to the vehicle 12 may be connected to the in-vehicle network 24 through the data link connector 26.

Further, an ignition switch 28 (hereinafter referred to as an "IGSW 28") is connected to the first ECU 20*a*. The first ECU 20*a* is activated responsive to ON and OFF operations of the IGSW 28, and further controls ON and OFF operations of other ECUs (i.e., the second ECU 20*b* and an ECU group made up of other non-illustrated ECUs).

(1-3. Vehicle Diagnostic System 14)

The vehicle diagnostic system 14 includes a diagnostic device 16 and a data collecting device 18.

(1-3-1. Diagnostic Device 16)

(1-3-1-1. Outline)

The diagnostic device 16 carries out various types of settings (operation settings) of the data collecting device 18, together with analyzing the collected data Dc (collected data Dc') that is collected from the vehicle 12 by the data collecting device 18, and performing various diagnostic operations such as a fault diagnosis, etc. The collected data Dc is data obtained by collecting over a comparatively long time period a large number of pieces of driving parameter data Dp (hereinafter also referred to as "parameter data Dp") related to vehicle operations during driving of the vehicle. In contrast thereto, the collected data Dc' is data of a comparatively short time period and which are extracted locally from the collected data Dc. As shown in FIG. 1, the diagnostic device 16 includes an input unit 30, a computation unit 32, a storage unit 34, a display unit 36, and a connector 38 providing a connection to the data collecting device 18.

The diagnostic device 16 can be constituted from a desktop computer, a notebook computer, a tablet computer, or a smart phone, for example.

Figure 3:
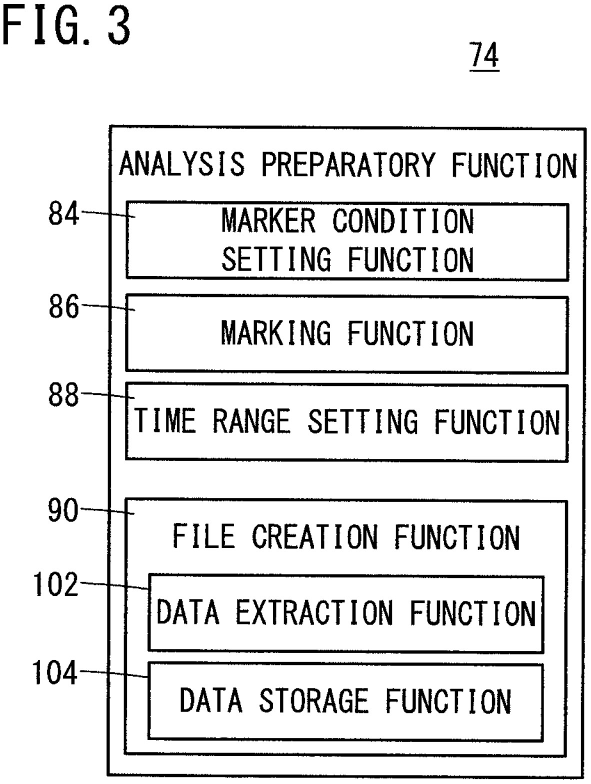
FIG. 3 is a view showing various functions of an analysis preparatory function possessed by a diagnostic device of a first embodiment.

The storage unit 34 stores one or more analysis files 34*a*, which are created by a later-described file creation function 90 (see FIG. 3). Further, as will be discussed later, the storage unit 34 stores in advance a diagnostic file 34*b* in order to enable selection only parameter data Dp to be used for diagnosis, from among the collected data Dc of the analysis file 34*a* and display the parameter data Dp in an easily viewable manner. The diagnostic file 34*b* includes a diagnostic set to be used when making a graphical display. The diagnostic set will be described later. Furthermore, the storage unit 34 stores various types of information and programs used in the present embodiment, together with temporarily storing various types of information.

Further, the storage unit 34 stores in advance a marker condition setting file 34*c* (hereinafter also referred to as a "condition setting file 34*c*"). The condition setting file 34*c* includes setting information for marker conditions Mc. The marker conditions Mc refer to conditions that must be satisfied when adding markers M with respect to the collected data Dc. In the setting information for the marker conditions Mc, there are included, for example, driving parameters P, judgment conditions for the driving parameters P, combination conditions ("and" conditions, "or" conditions, etc.) for a plurality of driving parameters P, an upper limit number Mmax for the number of markers M, and a driving parameter P (hereinafter referred to as a "final judgment parameter P") at which a determination of a judgment condition is performed lastly. The setting information for the marker conditions Mc is associated with name information of a symptom to be diagnosed (hereinafter referred to as a "diagnostic symptom") such as a fault symptom or symptom of a malfunction, and furthermore, is associated with time width information extracted from the collected data Dc.

(1-3-1-2. Various Functions)

Figure 2:
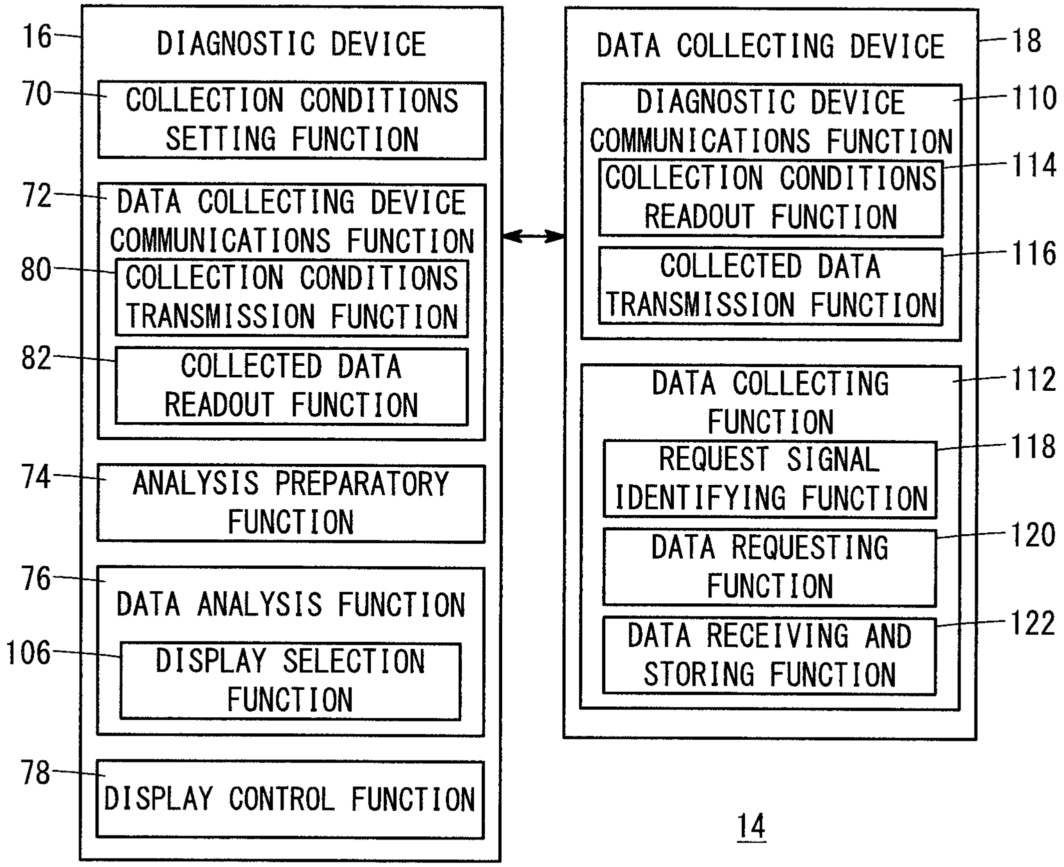
FIG. 2 is a view showing various functions possessed by a diagnostic device and a data collecting device.

FIG. 2 is a view showing various functions possessed by the diagnostic device 16 and the data collecting device 18. FIG. 3 is a view showing various functions of an analysis preparatory function 74 possessed by the diagnostic device 16. As shown in FIG. 2, the diagnostic device 16 includes a collection conditions setting function 70, a data collecting device communications function 72, an analysis preparatory function 74, a data analysis function 76, and a display control function 78. The respective functions 70, 72, 74, 76, 78 are realized by the computation unit 32 executing programs that are stored in the storage unit 34.

The collection conditions setting function 70 is a function to set data collection conditions, which are conditions by which the data collecting device 18 collects data, in the form of conditions (e.g., types of parameter data Dp, items, acquisition frequency, acquisition times, etc.) for collecting the parameter data Dp.

The data collecting device communications function 72 is a function associated with communications with the data collecting device 18, and includes a collection conditions transmission function 80 and a collected data readout function 82. The collection conditions transmission function 80 is a function for transmitting data collection conditions to the data collecting device 18. The collected data readout function 82 is a function to read out the collected data Dc from the data collecting device 18.

The analysis preparatory function 74 is a function for creating an analysis file 34*a* prior to performing a fault diagnosis. As shown in FIG. 3, the analysis preparatory function 74 includes a marker condition setting function 84, a marking function 86, a time range setting function 88, and a file creation function 90.

The marker condition setting function 84 is a function for setting marker conditions Mc. In the marker condition setting function 84, an input screen is displayed on the display unit 36, and input items, which are input or selected by way of the input unit 30, are stored as marker conditions Mc in the storage unit 34.

The marking function 86 is a function for adding a marker M to a point in time when a marker condition Mc is satisfied, among time points on the time axis of the collected data Dc. A marker M is added to the time information at the point in time that the marker condition Mc was satisfied. As an example, time information of the point in time when the marker condition Mc is satisfied is recorded. In the present specification, the action of adding a marker M to a point in time when a marker condition Mc is satisfied, among time points on the time axis of the collected data Dc, may also be referred to simply as "adding a marker M to the time axis".

The time range setting function 88 is a function for setting a time range estimated to be necessary for confirming the behavior of respective driving parameters P with reference to the point in time when the marker condition Mc was satisfied. In this case, a predetermined time range is set before and after the location (time information) of the marker M as a reference. The predetermined time range can be set by respectively and independently setting a time range before the reference and a time range after the reference.

The file creation function 90 is a function related to creation of the analysis files 34*a* (see FIG. 1), and includes a data extraction function 102 and a data storage function 104. The data extraction function 102 is a function to extract collected data Dc' of a predetermined time range, taking as a reference the location of a marker M added to the collected data Dc. The predetermined time range is set by the time range setting function 88. The data storage function 104 is a function for creating and storing individual analysis files 34*a* each time that the collected data Dc' is extracted.

Returning now to FIG. 2, a description of the functions of the diagnostic device 16 will be continued. The data analysis function 76 is a function for performing a fault diagnosis using the collected data Dc', and includes a display selection function 106. The display selection function 106 is a function for selecting driving parameters P to be displayed on the display unit 36 (see FIG. 1) from among the driving parameters P for which parameter data Dp has been collected.

The display control function 78 is a function for controlling the displayed content of the display unit 36. For example, based on the selection results in the display selection function 106, only graphs 284 (see FIG. 14) of selected driving parameters P are displayed on the display unit 36.

(1-3-2. Data Collecting Device 18)

(1-3-2-1. Outline)

The data collecting device 18 is connected to the in-vehicle network 24 through the data link connector 26 of the vehicle 12, and gathers and collects the parameter data Dp at times that the vehicle is being driven. As shown in FIG. 1, the data collecting device 18 includes an input unit 50, a computation unit 52, a storage unit 54, a display unit 56, and a data link cable 58.

(1-3-2-2. Various Functions)

As shown in FIG. 2, the data collecting device 18 includes a diagnostic device communications function 110 and a data collecting function 112. The respective functions 110, 112 are realized by programs that are stored in the storage unit 54 being executed by the computation unit 52.

The diagnostic device communications function 110 is a function associated with communications with the diagnostic device 16, and includes a collection conditions readout function 114 and a collected data transmission function 116. The collection conditions readout function 114 is a function for the data collecting device 18 to read out the data collection conditions from the diagnostic device 16. The collected data transmission function 116 is a function for transmitting to the diagnostic device 16 the collected data Dc collected by the data collecting device 18.

The data collecting function 112 is a function associated with collection of the parameter data Dp of the vehicle 12, and includes a request signal identifying function 118, a data requesting function 120, and a data receiving and storing function 122. The request signal identifying function 118 is a function to identify a data request signal Sreq to be transmitted. The data requesting function 120 is a function to request parameter data Dp of a particular item designated for collection from an ECU 20 which is a target requested for the parameter data Dp (hereinafter referred to as a "target ECU 20tar"). The data receiving and storing function 122 is a function for receiving respective parameter data Dp that respective target ECUs 20tar have output in response to the data request signal Sreq, and storing the data as collected data Dc in the storage unit 54.

[2. Collected Data Dc]

The collected data Dc in the present embodiment are data used to make a fault diagnosis, and are time series data of respective driving parameters P indicative of operation states of the various ECUs 20, which are recorded by the data collecting device 18 attached to the vehicle 12. In order to distinguish them from each other, the collected data Dc are each recorded in association with a date and time at which the data is collected. The collected data Dc are created on the basis of data collection conditions set by the user, using the collection conditions setting function 70 of the diagnostic device 16.

[3. Fault Diagnosis]

Next, various operations and processes concerning the fault diagnosis in the present embodiment will be described.

(3-1. Process Flow)

Figure 4:
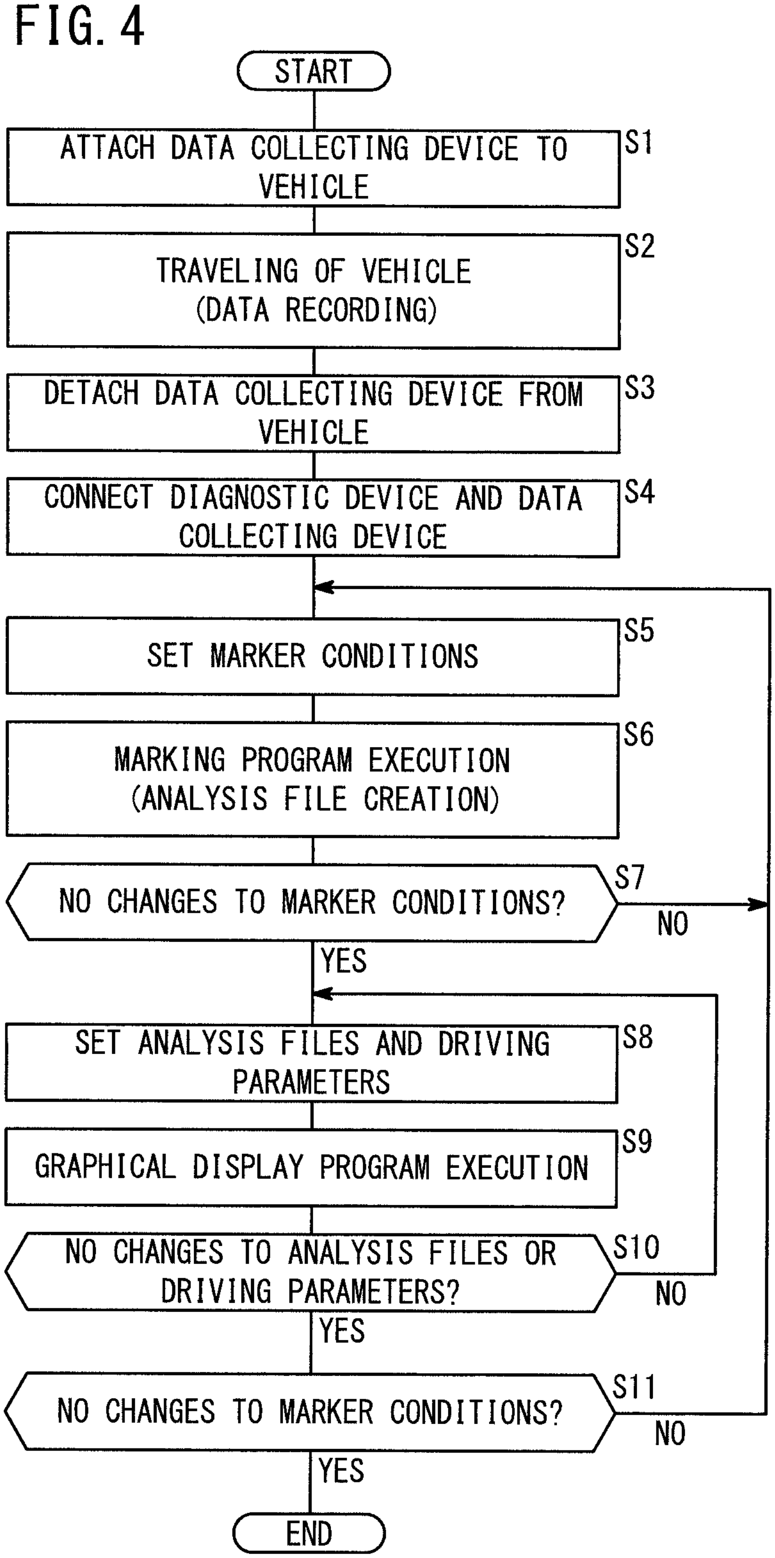
FIG. 4 is a flowchart showing the process flow of fault diagnosis operations executed in each embodiment.

FIG. 4 is a flowchart showing the process flow of fault diagnosis operations executed in the present embodiment. The operations of steps S1 through S3 shown in FIG. 4 are operations to collect various parameter data Dp from the vehicle 12. The operations of steps S4 through S7 shown in FIG. 4 are operations to extract the collected data Dc' by setting a marker condition Mc, and to store the data in analysis files 34*a*. The operations of steps S8 through S10 are operations to perform a fault diagnosis of the vehicle 12 using the analysis files 34*a*.

Prior to the series of operations shown in FIG. 4, the operator sets data collection conditions in advance in the data collecting device 18. At this time, as shown in FIG. 1, a connector 64 of the data link cable 58 of the data collecting device 18 is connected to the connector 38 of the diagnostic device 16 to thereby connect the diagnostic device 16 and the data collecting device 18. In addition, using the collection conditions setting function of the diagnostic device 16 (see FIG. 2), the data collection conditions are set with respect to the data collecting device 18. After the data collection conditions have been set, the operator disconnects the connector 64 of the data link cable 58 from the connector 38, and separates the diagnostic device 16 away from the data collecting device 18.

In step S1, the operator attaches the data collecting device 18 with respect to the vehicle 12. At this time, the connector 64 of the data link cable 58 of the data collecting device 18 is connected to the data link connector 26 of the vehicle 12. In step S2, the user of the vehicle 12 causes the vehicle 12 having the data collecting device 18 to travel for a predetermined period of time, for example, a period of several days to several weeks. During this period, the data collecting device 18 transmits a data request signal Sreq to an ECU 20 specified by the data collection conditions, respective parameter data Dp output by the ECU 20 are collected, and the data are stored in the storage unit 54 as collected data Dc. After elapse of the collection period, in step S3, the operator detaches the data collecting device 18 from the vehicle 12.

In step S4, the operator once again connects the connector 64 of the data link cable 58 of the data collecting device 18 to the connector 38 of the diagnostic device 16, whereupon the diagnostic device 16 and the data collecting device 18 are connected. At this time, information in relation to the collected data Dc (the types of collected driving parameters P, the types of ECUs 20 from which data was collected, etc.) is transmitted from the data collecting device 18 to the diagnostic device 16.

Figure 5:
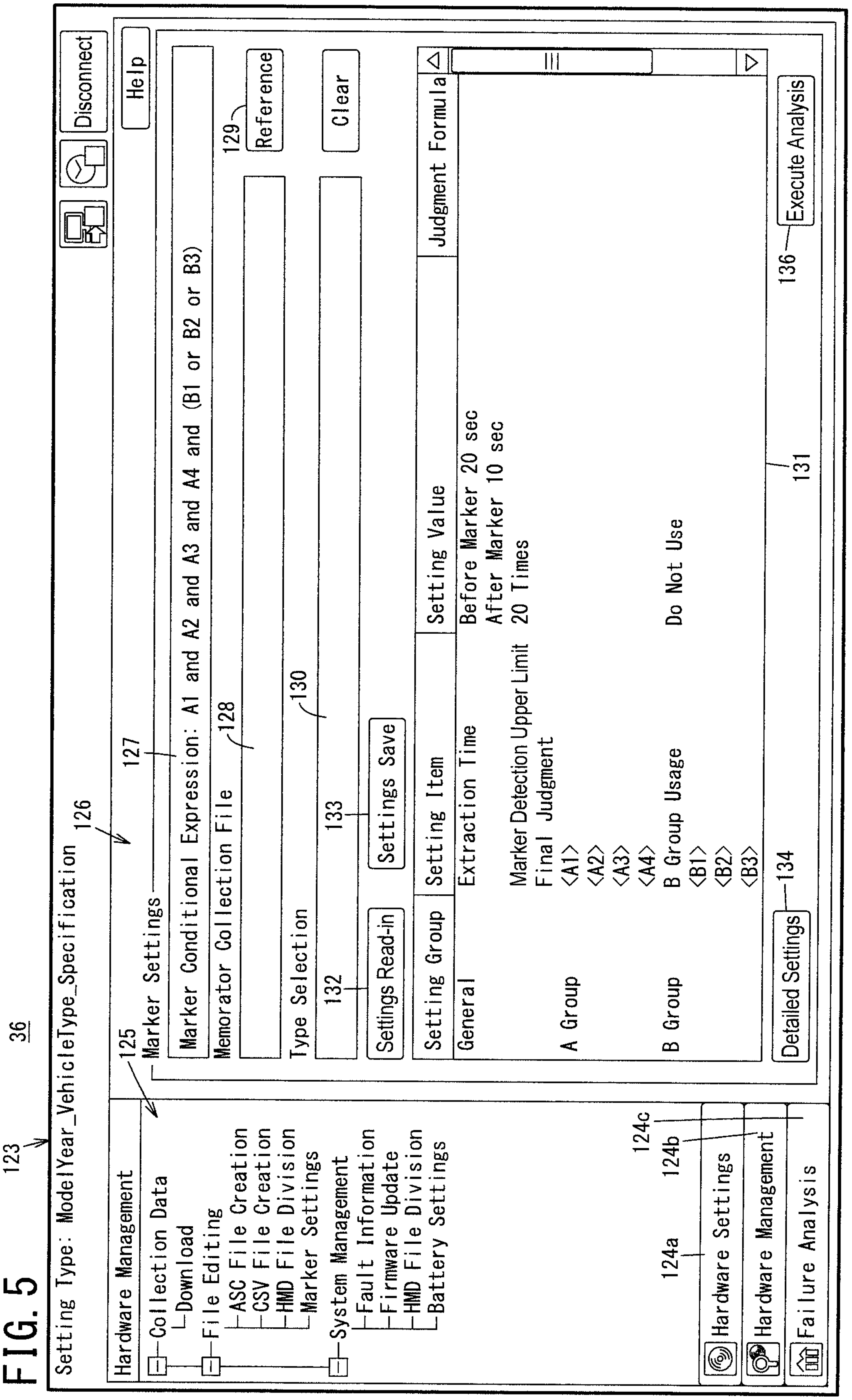
FIG. 5 is a view showing an operation screen including a marker conditions display section.

In step S5, the operator operates the input unit 30 to cause an operation screen 123 shown in FIG. 5 to be displayed on the display unit 36. In addition, on the selection screen 140 shown in FIG. 6, driving conditions considered to be related to the occurrence of the fault to be diagnosed are set as marker conditions Mc. In step S6, the operator issues an instruction to execute the marking program. When the marking program is executed, a marker M is added to a point in time when a marker condition Mc is satisfied, among the time points on the time axis of the collected data Dc. At this time, the collected data is read out sequentially, and each time that a marker condition Mc is satisfied, a marker M is added to the point in time that the marker condition Mc is satisfied. In addition, the collected data Dc' that occurred within a predetermined time period with reference to the point in time at which the marker M was added is extracted, and the collected data Dc' is stored in an analysis file 34*a*.

In step S7, in the event that the operator does not make any changes to the marker conditions Mc (step S7: YES), then the process proceeds to step S8. On the other hand, if the operator makes changes to the marker conditions Mc (step S7: NO), the process returns to step S5.

Figure 11:
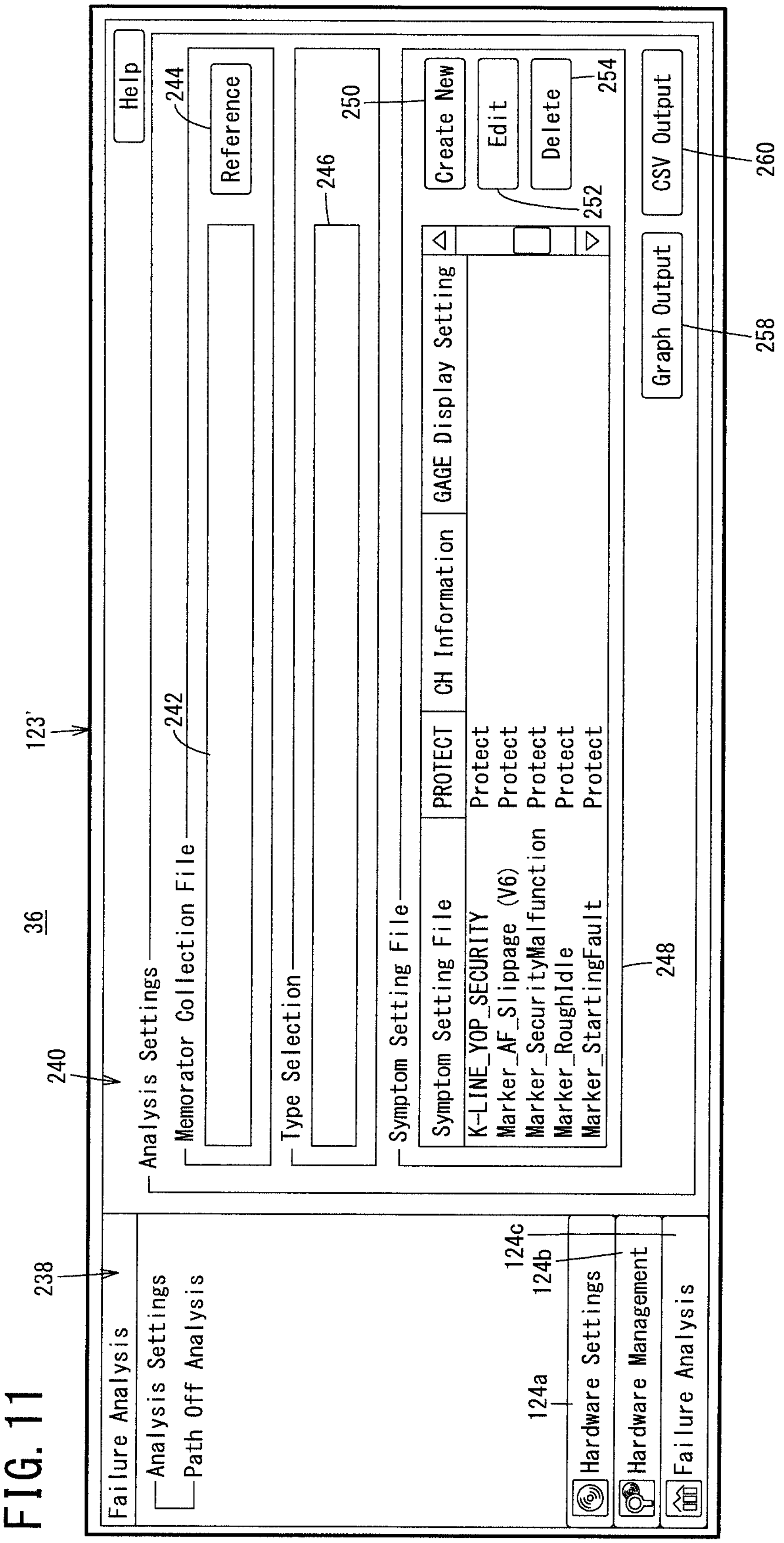
FIG. 11 is a view showing a screen including a symptom setting file selecting section.
Figure 14:
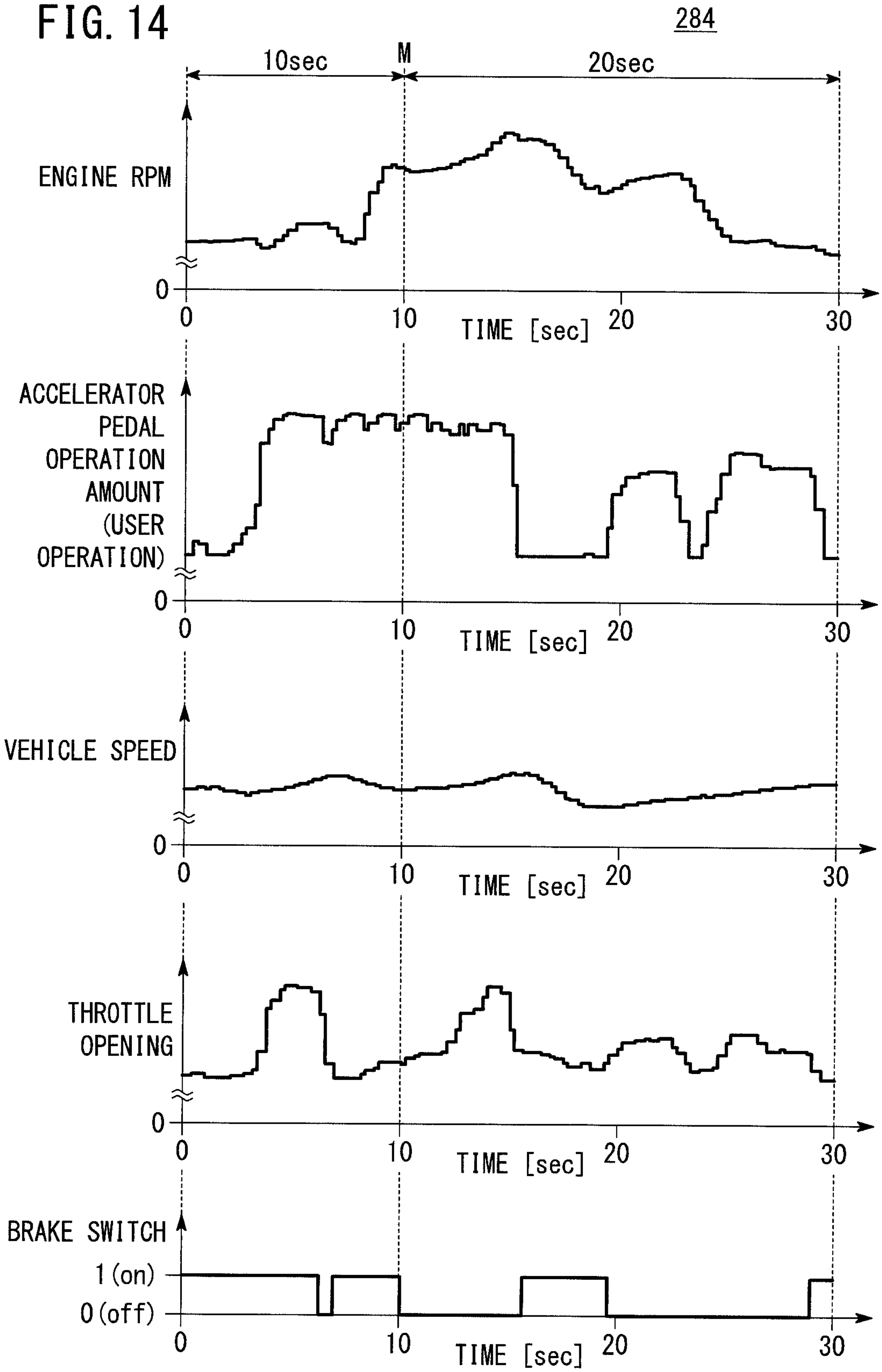
FIG. 14 is a graph showing parameter data of five driving parameters.

In step S8, on the operation screen 123' shown in FIG. 11, the operator selects an analysis file 34*a* to be used for diagnosis, and the driving parameters P to be displayed on the screen as a graph for analysis. Normally, a plurality of driving parameters P are selected. In step S9, the operator issues an instruction with respect to the diagnostic device 16 to execute the graphical display program. When the graphical display program is executed, as shown in FIG. 14, the parameter data Dp corresponding to the selection made in step S8 are displayed as graphs 284 on the display unit 36.

In step S10, in the event that the operator does not make any changes to the analysis files 34*a* or the driving parameters P to be displayed (step S10: YES), then the process proceeds to step S11. On the other hand, if the operator makes changes to the analysis files 34*a* or the driving parameters P to be displayed (step S10: NO), the process returns to step S8.

In step S11, in the event that the operator does not make any changes to the marker conditions Mc (step S11: YES), the series of processes are brought to an end. On the other hand, if the operator makes changes to the marker conditions Mc (step S11: NO), the process returns to step S5.

(3-2. Setting of Marker Conditions Mc)

Figure 6:
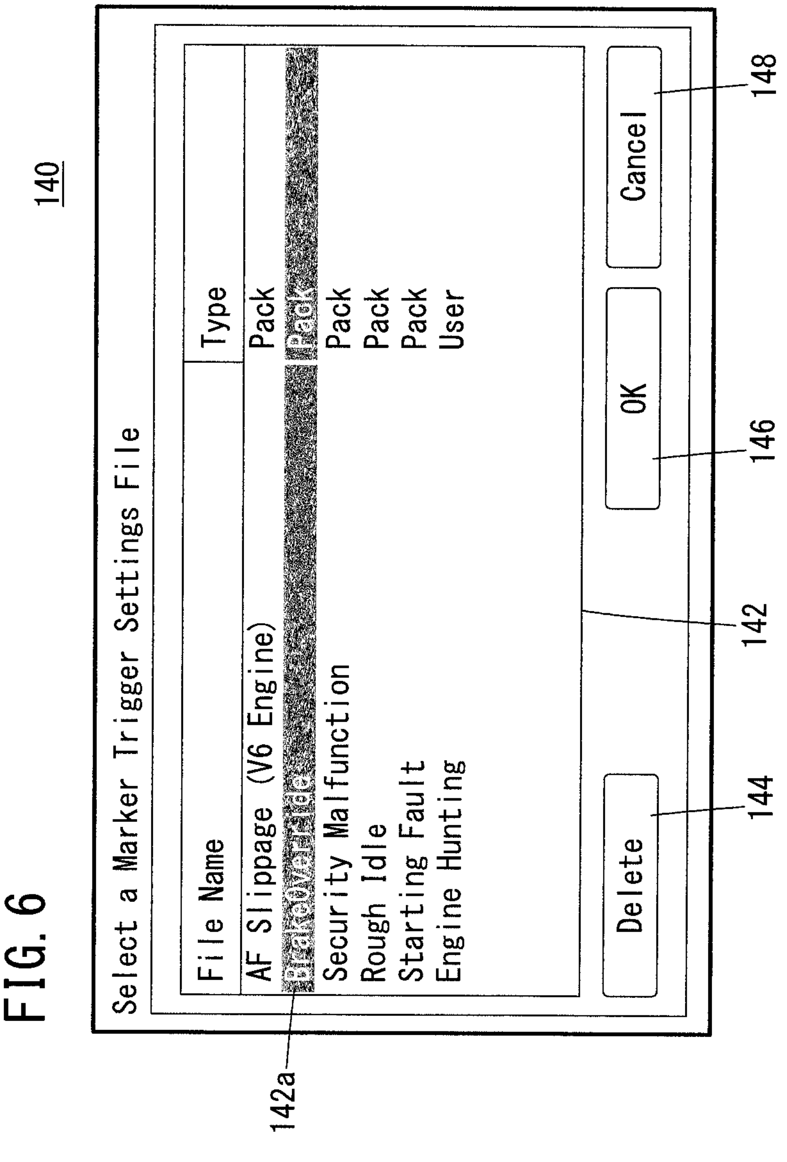
FIG. 6 is a view showing a marker condition setting file selection screen.
Figure 7:
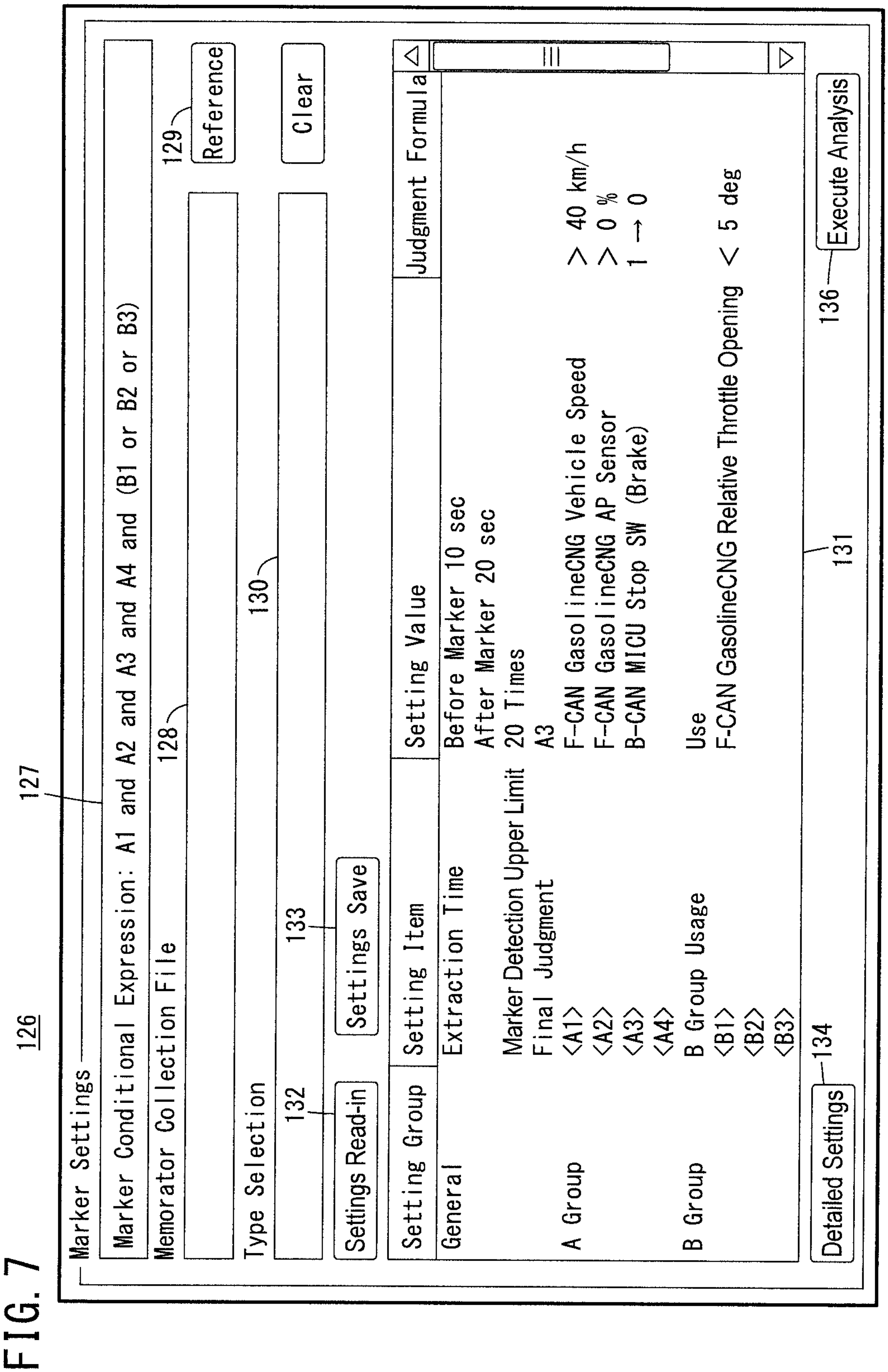
FIG. 7 is a view showing the marker conditions display section in which marker conditions have been set.

Operations for setting the marker conditions Mc, as performed in step S5 of FIG. 4, will now be described with reference to FIGS. 5 through 7. FIG. 5 is a view showing an operation screen 123 including a marker conditions display section 126. FIG. 6 is a view showing a selection screen 140 for selecting a marker condition setting file 34*c*. FIG. 7 is a view showing the marker conditions display section 126 in which marker conditions Mc have been set. The processes of displaying the operation screen 123 and the selection screen 140, and the process of setting the marker conditions Mc, to be described below, are processes carried out by the marker condition setting function 84 and the time range setting function 88 shown in FIG. 3.

(3-2-1. Operation Screen 123)

The operator operates the input unit 30 (keyboard, mouse, touch panel, etc.) of the diagnostic device 16 to thereby initiate the fault diagnosis program. Upon doing so, the operation screen 123 is displayed on the display unit 36 of the diagnostic device 16. At this stage, on the operation screen 123, an initial screen (not shown) is displayed including menu selection buttons 124*a* to 124*c* shown in FIG. 5. When the operator operates the input unit 30 and selects the button 124*b*, a menu 125 is displayed. Furthermore, when the item "Marker Settings" of the menu 125 is selected, the display transitions to the operation screen 123 including the marker conditions display section 126 shown in FIG. 5.

A description will now be given of the operation screen 123. As shown in FIG. 5, the operation screen 123 includes the menu selection buttons 124*a* to 124*c*, the menu 125, and the marker conditions display section 126.

The menu selection buttons 124*a* to 124*c* are buttons for selecting from among multiple menus ("Hardware Settings", "Hardware Management", and "Failure Analysis"). As shown in step S5 of FIG. 4, on the various setting screens, when marker conditions Mc are set in order to add markers M, the button 124*b* (Hardware Management) is selected. Further, although it will be discussed later, as shown in step S8 of FIG. 4, when analysis files 34*a* and driving parameters P are selected in order to display graphs, the button 124*c* (Failure Analysis) is selected.

The menu 125 is displayed in the case that the button 124*b* is selected, and displays a list of functions that can be executed. The respective functions shown in the list can be selected by operating the input unit 30.

The marker conditions display section 126 (hereinafter also referred to as a "conditions display section 126") includes a marker conditional expression field 127 (hereinafter also referred to as a "conditional expression field 127"), a file field 128, a reference button 129, a type selection field 130, a marker conditions list 131 (hereinafter also referred to as a "conditions list 131"), a settings read-in button 132, a settings save button 133, a details setting button 134, and an analysis execution button 136.

The conditional expression field 127 displays a conditional expression (a combination condition) of the marker conditions Mc. In the present embodiment, the conditional expression is constituted from an A group and a B group. The A group is represented by the letters A1 to A4. Judgment conditions of the driving parameters P are set in A1 to A4. The judgment condition of the combination of A1 to A4 is an "and" condition. The B group is represented by the letters B1 to B3. Judgment conditions of the driving parameters P are set in B1 to B3. The judgment condition of the combination of B1 to B3 is an "or" condition.

The reference button 129 is a button that is operated by the operator. When the operator operates the reference button 129 via the input unit 30, a list of all of the files stored in the data collecting device 18 is displayed on a separate screen (not shown). When the operator selects one file from the list via the input unit 30, the file field 128 displays a file name of the selected file. The type selection field 130 displays a type name of the selected file.

The conditions list 131 displays information of the marker conditions Mc which are set at that point in time. The conditions list 131 displays predetermined conditions of the marker conditions Mc at the point in time that the conditions display section 126 is displayed for the first time after initiation of the fault diagnosis program. The conditions list 131 shown in FIG. 5 displays such predetermined conditions.

The settings read-in button 132 is a button for reading in and setting predetermined marker conditions Mc from the condition setting files 34*c* that are stored in advance in the storage unit 34. When the operator operates the settings read-in button 132, a selection screen 140 of the condition setting files (see FIG. 6) is displayed. When the operator selects one file name 142*a* from the selection screen 140 via the input unit 30, marker conditions Mc are read out from the condition setting file 34*c* corresponding to the selected file name 142*a* and displayed in a conditions list 131.

The settings save button 133 is a button for saving the marker conditions Mc displayed in the conditions list 131 in the storage unit 34. When the operator operates the settings save button 133, the marker conditions Mc displayed in the conditions list 131 are saved in the storage unit 34. At this time, a separate screen (not shown) is displayed, and on this screen, a file name and saving destination are set by the operator.

The details setting button 134 is a button for editing the marker conditions Mc displayed in the conditions list 131. When the operator operates the details setting button 134, a details setting screen 340 is displayed (see FIG. 16). On the details setting screen 340, the operator is capable of editing the marker conditions Mc through the input unit 30. After editing, the marker conditions Mc are displayed in the conditions list 131. Editing of the marker conditions Mc on the details setting screen 340 will be described later in connection with a second embodiment.

When setting the marker conditions Mc, the operator operates either one of the settings read-in button 132 or the details setting button 134. The operator can set predetermined marker conditions Mc by operating the settings read-in button 132, and can set unique marker conditions Mc by operating the details setting button 134.

The analysis execution button 136 is a button for executing a marking process. When the operator operates the analysis execution button 136, the marking process (see FIG. 8) is executed in accordance with the marker conditions Mc displayed in the conditions list 131.

(3-2-2. Selection Screen 140)

As noted above, when the settings read-in button 132 is operated in a state with the operation screen 123 shown in FIG. 5 displayed, the selection screen 140 shown in FIG. 6 is displayed. The selection screen 140 is a screen for setting predetermined marker conditions Mc.

As shown in FIG. 6, the selection screen 140 includes a file list 142, a delete button 144, an OK button 146, and a cancel button 148.

The file list 142 displays a list of the file names 142*a* of the condition setting files 34*c* that are stored in the storage unit 34. The file names 142*a* may be regarded as diagnostic symptom names. Among the file names 142*a* displayed in the file list 142, an operator can select any one of the file names 142*a* from within the file list 142 via the input unit 30. The selected file name 142*a* is highlighted.

The delete button 144 is a button for deleting the condition setting file 34*c* of the selected file name 142*a*. The OK button 146 is a button for reading out setting information of the marker conditions Mc from the condition setting file 34*c* of the selected file name 142*a*. The cancel button 148 is a button for canceling the operation of reading out the setting information of the marker conditions Mc from the condition setting file 34*c*.

The condition setting files 34*c* can be added appropriately, and by setting a unique marker condition Mc by operating the details setting button 134, the file names 142*a* corresponding thereto can be added and registered. (Detailed description of this feature is omitted.)

(3-2-3. Setting Results)

In the selection screen 140 shown in FIG. 6, when the OK button 146 is operated, setting information of the marker conditions Mc associated with the selected file name 142*a* are read out from the condition setting file 34*c*, and a checking process is carried out thereon. In this instance, the driving parameters P included in the setting information that was read out are collated with the driving parameters P included in the collected data Dc. If the collation result matches, the setting information read out from the condition setting file 34*c* is confirmed as the marker conditions Mc. At this time, the selection screen 140 is closed. As shown in FIG. 7, in the marker conditions display section 126 of the operation screen 123, the setting information (the respective setting conditions displayed in the conditions list 131) read out from the condition setting file 34*c* is displayed as marker conditions Mc and/or as other conditions apart therefrom.

In the present embodiment, as setting information corresponding to the selected file name 142*a* "BrakeOverride", there are set as the marker conditions Mc "A1: Vehicle Speed>40 km/h", "A2: AP Sensor>0%", "A3: Stop SW (Brake) 1→0" and "B1: Relative Throttle Opening<5 Deg", which are displayed in the conditions list 131.

(3-3. Execution of Marking Program)

(3-3-1. Overall Flow of Processes by the Marking Program)

Figure 8:
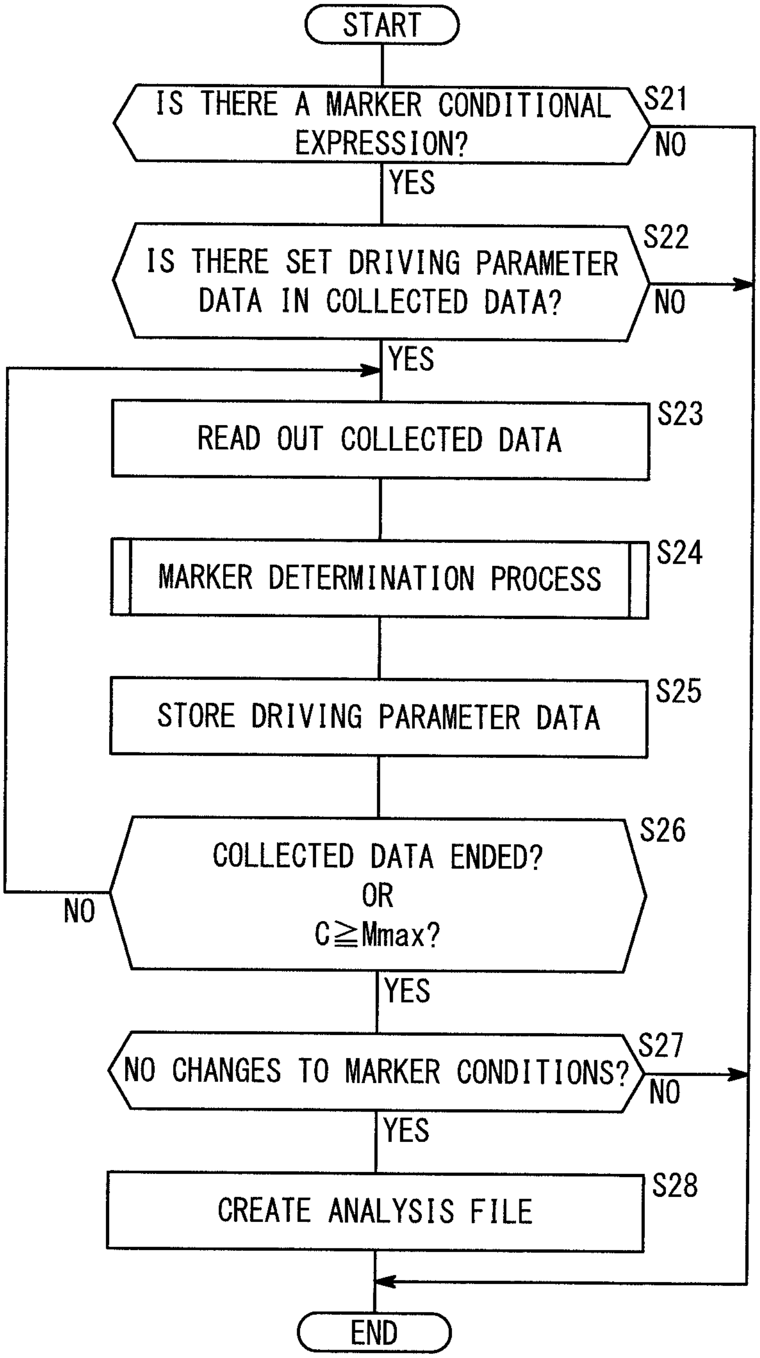
FIG. 8 is a flowchart showing the process flow of a marking program executed by the diagnostic device.
Figure 10A:
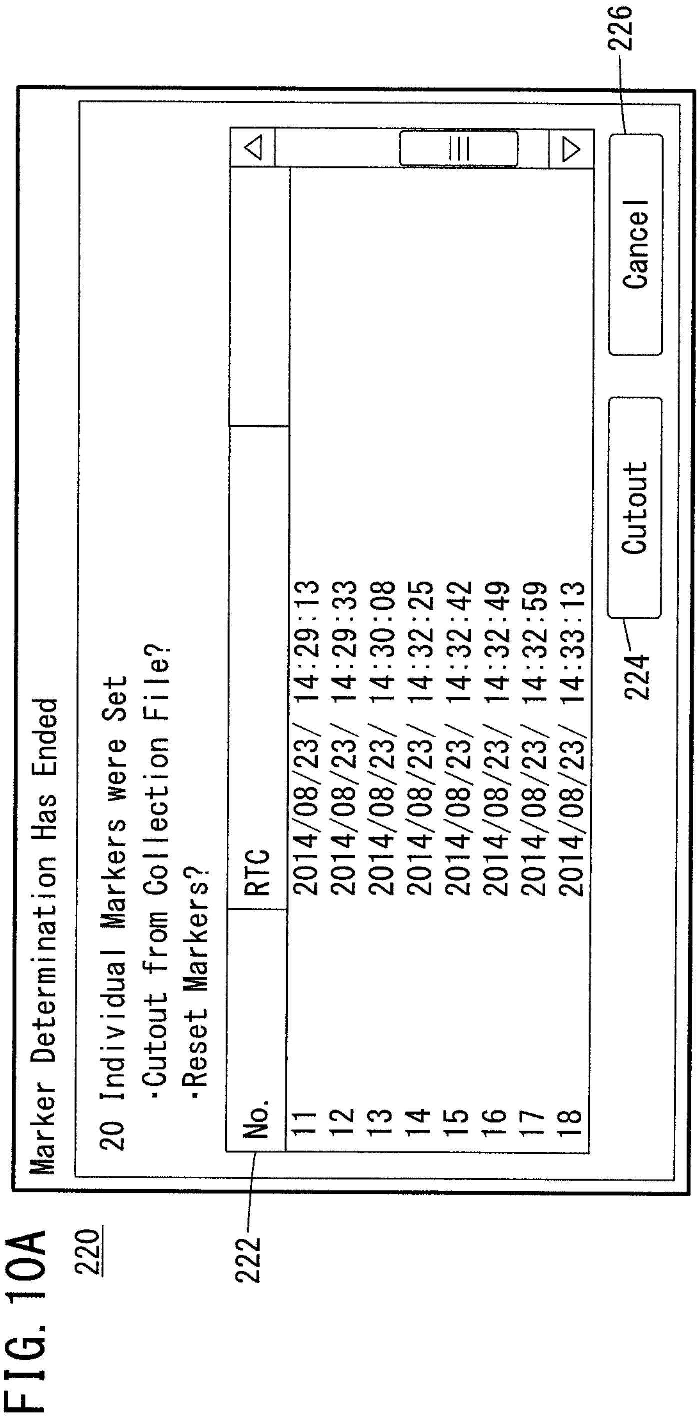
FIG. 10A is a view showing a sub-screen displayed at a time that the marker determination process is completed.
Figure 10B:
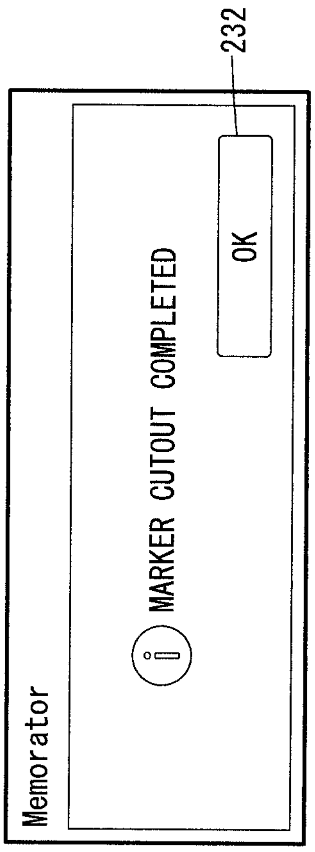
FIG. 10B is a view showing a sub-screen displayed after creation of an analysis file.

Concerning the executed operations of the marking program performed in step S6 of FIG. 4, a description thereof will be presented with reference to FIGS. 8, 10A and 10B. FIG. 8 is a flowchart showing the process flow of the marking program executed by the diagnostic device 16. FIG. 10A is a view showing a sub-screen 220 displayed at a time that the marker determination process is completed, and FIG. 10B is a view showing a sub-screen 230 displayed after creation of the analysis file 34*a*.

When the analysis execution button 136 included in the conditions display section 126 shown in FIG. 7 is operated, the computation unit 32 of the diagnostic device reads out and executes the marking program from the storage unit 34. Upon doing so, the processes shown in FIG. 8 are executed. The processes of steps S21 to S27 shown in FIG. 8 are handled primarily by the marking function 86 (see FIG. 3), whereas the process of step S28 is handled primarily by the file creation function 90 (see FIG. 3).

In step S21 of FIG. 8, it is determined whether or not a marker conditional expression is set. In this instance, it is determined whether or not at least one driving parameter P is set in the A group of the conditions list 131 shown in FIG. 7. In the case that such a marker condition Mc is set (step S21: YES), the process proceeds to step S22. On the other hand, in the event that such a marker condition Mc is not set (step S21: NO), the marking program process is brought to an end.

In step S22, it is determined whether or not the parameter data Dp of the driving parameters P included in the marker conditions Mc is present in the collected data Dc. More specifically, a judgment is made as to the presence or absence of the parameter data Dp of the driving parameters P set in the A group or the B group of the conditions list 131 shown in FIG. 7. When the diagnostic device 16 and the data collecting device 18 are connected, the diagnostic device 16 acquires from the data collecting device 18 information of the driving parameters P included in the collected data Dc. For this reason, the diagnostic device 16 is capable of collating and verifying the driving parameters P. In the case that the parameter data Dp is present (step S22: YES), the process proceeds to step S23. On the other hand, in the event that the parameter data Dp is not present (step S22: NO), the marking program process is brought to an end.

In step S23, the diagnostic device 16 reads out the collected data Dc from the data collecting device 18 sequentially in the order of the recording time thereof, and samples the collected data Dc. In this case, sampling of the collected data Dc is carried out at fixed time intervals. Such a fixed time interval is referred to as a sampling time ts.

In step S24, the diagnostic device 16 performs a marker determination process (see FIG. 9) which will be described later. In the case that the marker conditions Mc are satisfied in the read-out collected data Dc, the diagnostic device 16 adds the markers M to points of time at which the marker conditions Mc were satisfied among the respective points of time on the time axis of the collected data Dc.

In step S25, the predetermined parameter data Dp is stored. For example, in the judgment conditions of the A group or the B group, there may be set any one of a time which a change occurs from "0 (OFF)" to "1 (ON)", a time when a change occurs from "1 (ON)" to "0 (OFF)", a time when a change occurs from "Lo" to "Hi", and a time when a change occurs from "Hi" to "Lo". More specifically, it is assumed that the above judgment conditions are set in the A group or the B group of the conditions list 131 shown in FIG. 7. Such judgment conditions serve for the purpose of making a comparison between the data at the time of judgment and the data before the time of judgment. Therefore, sampling data of one time prior to the most recent sampling data is always required. In step S25, at the time the collected data Dc is read out, the diagnostic device 16 temporarily stores the most recent sampling data in the storage unit 34 in relation to the driving parameters P in which the aforementioned judgment conditions were set. The stored sampling data is used in the next marker determination process (step S24).

In step S26, a determination is made as to whether or not reading out of the collected data Dc is completed, or whether or not a marker counter C is greater than or equal to the upper limit number Mmax. The upper limit number Mmax is set at the time that the marker conditions Mc are set using the selection screen 140, however, it is also possible for the operator to change the upper limit number Mmax. If the collected data Dc has ended, or if the marker counter C is greater than or equal to the upper limit number Mmax (step S26: YES), then the process proceeds to step S27. On the other hand, if the collected data Dc has not ended, or if the marker counter C is less than the upper limit number Mmax (step S26: NO), then the process returns to step S23.

In step S27, it is confirmed whether or not there are changes to the marker conditions Mc. At this point in time, the process of adding markers M is completed, and the sub-screen 220 shown in FIG. 10A is displayed on the display unit 36. On the sub-screen 220, a list 222 is displayed of consecutive numbers of the markers M, as well as date and time information as to when the markers M were added. The date and time information as to when the markers M were added is the data collection date and time of each of the parameter data Dp that satisfies the marker conditions Mc, and corresponds to each point in time on the time axis of the collected data Dc. Incidentally, in the event that narrowing down of the data in accordance with the marker conditions Mc is not appropriate, cases may occur in which the number of markers M is large. Therefore, if the number of markers M is greater than expected, the marker conditions Mc may be changed. In the case that the operator changes the marker conditions Mc, a cancel button 226 of the sub-screen 220 is operated. If the cancel button 226 has been operated (step S27: NO), the marking program process is brought to an end. On the other hand, in the case an analysis file 34*a* is created, the operator operates a cut-out button 224 of the sub-screen 220. If the cut-out button 224 is operated (step S27: YES), the process proceeds to step S28.

Figure 16:
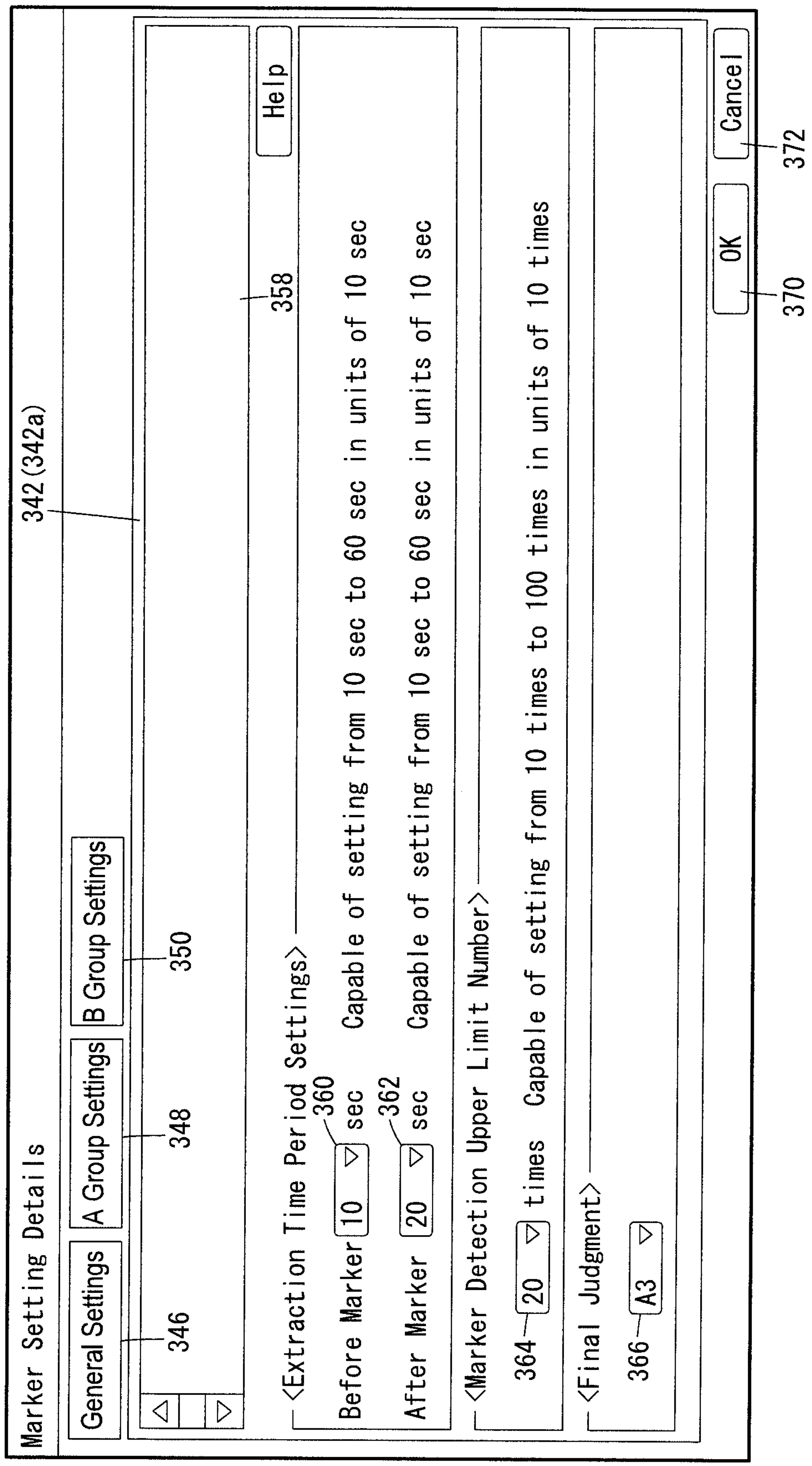
FIG. 16 is a diagram showing a detailed setting screen for setting individual conditions that make up the marker conditions.

In step S28, the analysis file 34*a* is created. In this instance, with reference to the points in time that the markers M were added, the collected data Dc' that was generated (took place) within a given time width, which was set by extraction time period setting fields 360, 362 of FIG. 16, is extracted. In addition, analysis files 34*a* are created and stored for each of the collected data Dc' that are extracted. The respective analysis files 34*a* created in step S28 are stored collectively in one folder. When extraction (cutting out) of the collected data Dc' and creation of the analysis files 34*a* are completed, the sub-screen 230 shown in FIG. 10B is displayed. When an OK button 232 is operated, the process of the marking program is brought to an end.

(3-3-2. Marker Determination Process)

Figure 9:
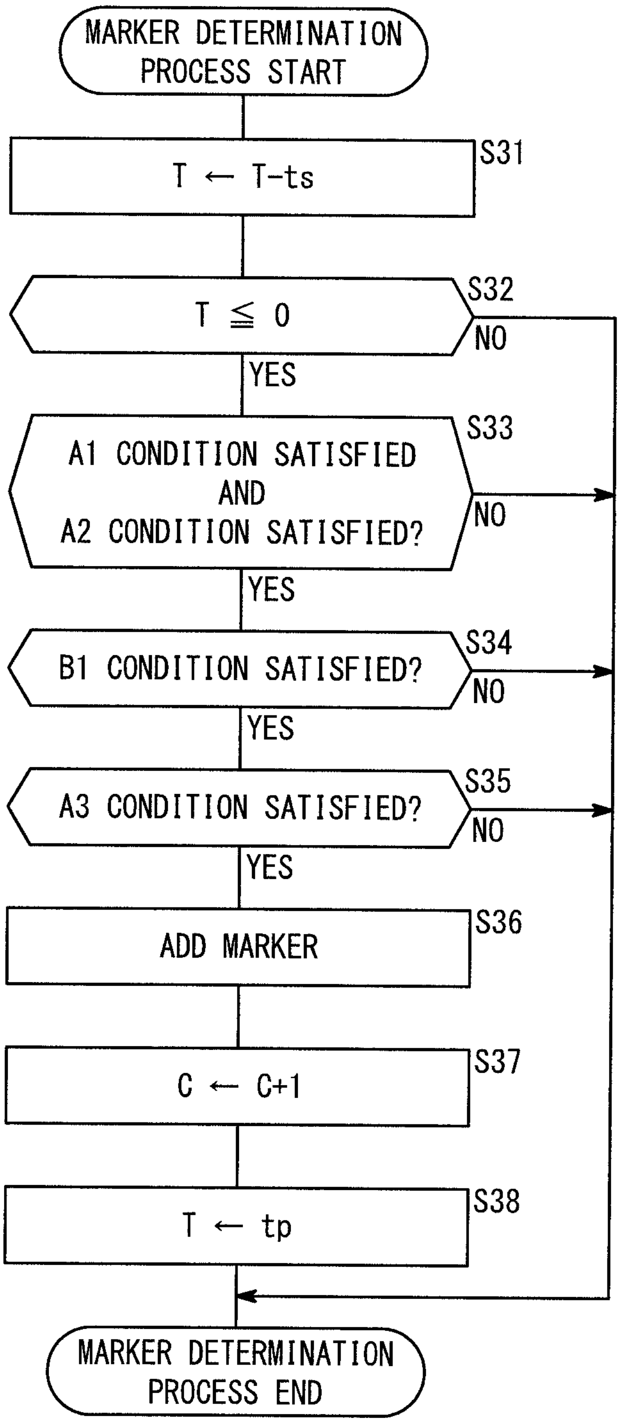
FIG. 9 is a flowchart showing the process flow of the marker determination process performed at a time that the marking program is executed.

The marker determination process performed in step S24 of FIG. 8 will be described with reference to FIG. 9. FIG. 9 is a flowchart showing the process flow of the marker determination process performed at a time that the marking program is executed. The marker determination process shown in FIG. 9 is performed each time that the collected data Dc is sampled.

In step S31, a value obtained by subtracting the sampling time is from the currently set value of the timer T is set in the timer T. According to the present embodiment, on the time axis of the collected data Dc, a marker M is not added unless a predetermined marker stop time tp elapses from the point in time at which the marker condition Mc was satisfied. The timer T is used to determine whether or not the sampled collected data Dc is data that was generated after the marker stop time tp or more had elapsed from the most recent point in time at which the marker condition Mc was satisfied. The initial value of the timer T is set to zero, and the marker stop time tp is set to the timer T when the marker condition Mc is satisfied (step S38, as will be described later).

In step S32, it is determined whether or not the value of the timer T is less than or equal to zero. Stated otherwise, it is determined whether or not the sampled collected data Dc is data that was generated after the marker stop time tp or more had elapsed from the most recent point in time at which the marker condition Mc was satisfied. If the value of the timer T is less than or equal to zero (step S32: YES), the process proceeds to step S33. On the other hand, if the value of the timer T is greater than zero (step S32: NO), the marker determination process is brought to an end.

In step S33, it is determined whether or not the conditions of the A group have been satisfied. According to the present embodiment, conditions A1 to A3 are set as shown in FIG. 7, and furthermore, condition A3 is set as a final judgment parameter P. Therefore, in step S33, a determination is made as to whether or not the judgment conditions of the driving parameters P set in conditions A1 and A2 have been satisfied out of the conditions A1 to A3. In the case that both conditions have been satisfied (step S33: YES), the process proceeds to step S34. On the other hand, in the event that either of the judgment conditions or both of the judgment conditions have not been satisfied (step S33: NO), the marker determination process is brought to an end.

In step S34, it is determined whether or not the conditions of the B group have been satisfied. According to the present embodiment, only the condition B1 shown in FIG. 7 is set. Therefore, in step S34, a determination is made as to whether or not the judgment condition of the driving parameters P set in condition B1 has been satisfied. In the case that the judgment condition has been satisfied (step S34: YES), the process proceeds to step S35. On the other hand, in the event that the judgment condition has not been satisfied (step S34: NO), the marker determination process is brought to an end.

In step S35, a determination is made as to whether or not the condition A3 of the final judgment parameter P has been satisfied. In the case that the judgment condition of the driving parameter P set to A3 has been satisfied (step S35: YES), the process proceeds to step S36. On the other hand, if the judgment condition has not been satisfied (step S35: NO), the marker determination process is brought to an end.

In step S36, a marker M is added to the time axis of the sampled collected data Dc. In step S37, a count of is added to the marker counter C. In step S38, the marker stop time tp is set in the timer T. The marker determination process with respect to the above-described sampled collected data Dc is now brought to an end.

(3-4. Setting of Driving Parameters P to be Graphically Displayed)

Figure 12:
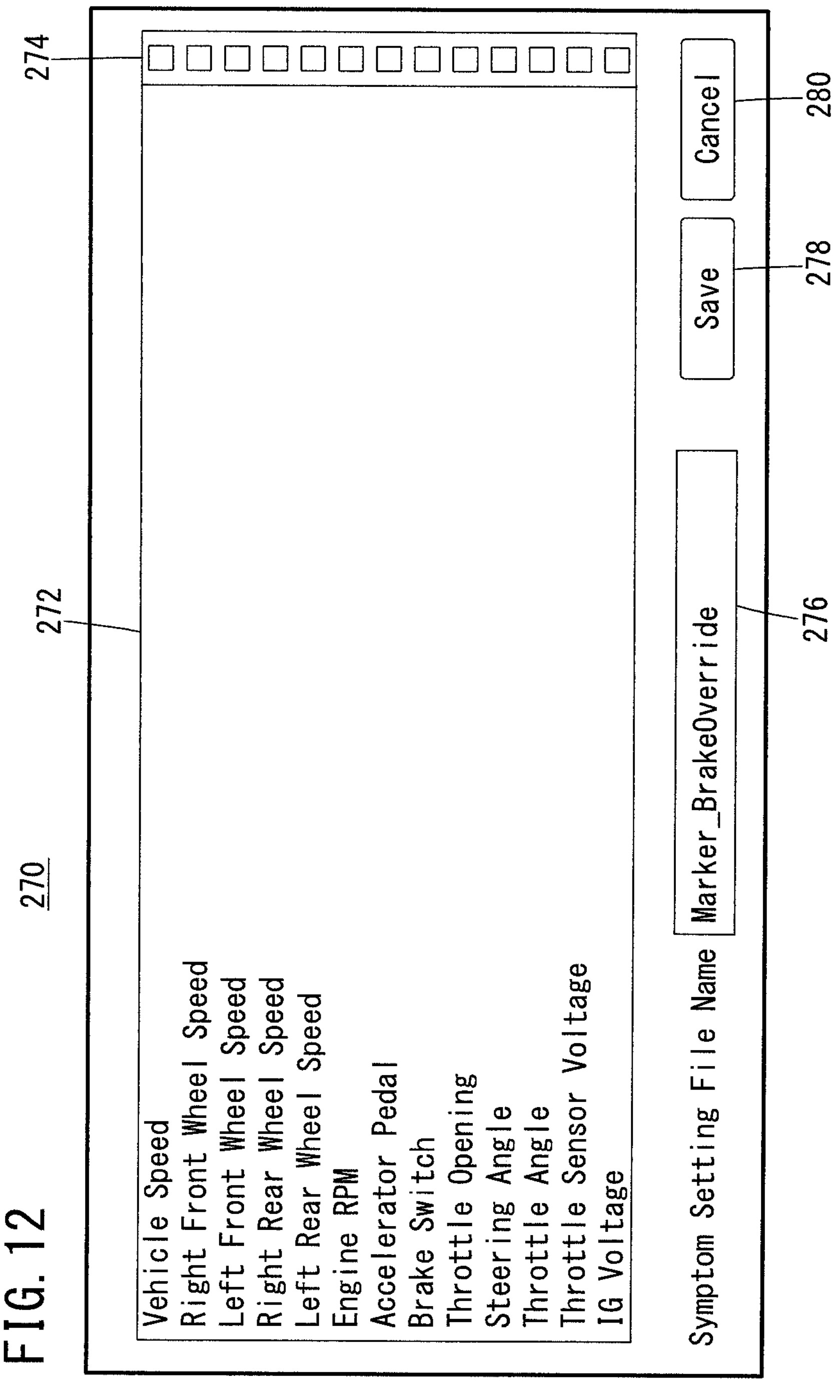
FIG. 12 is a view showing a file creation screen.
Figure 13:
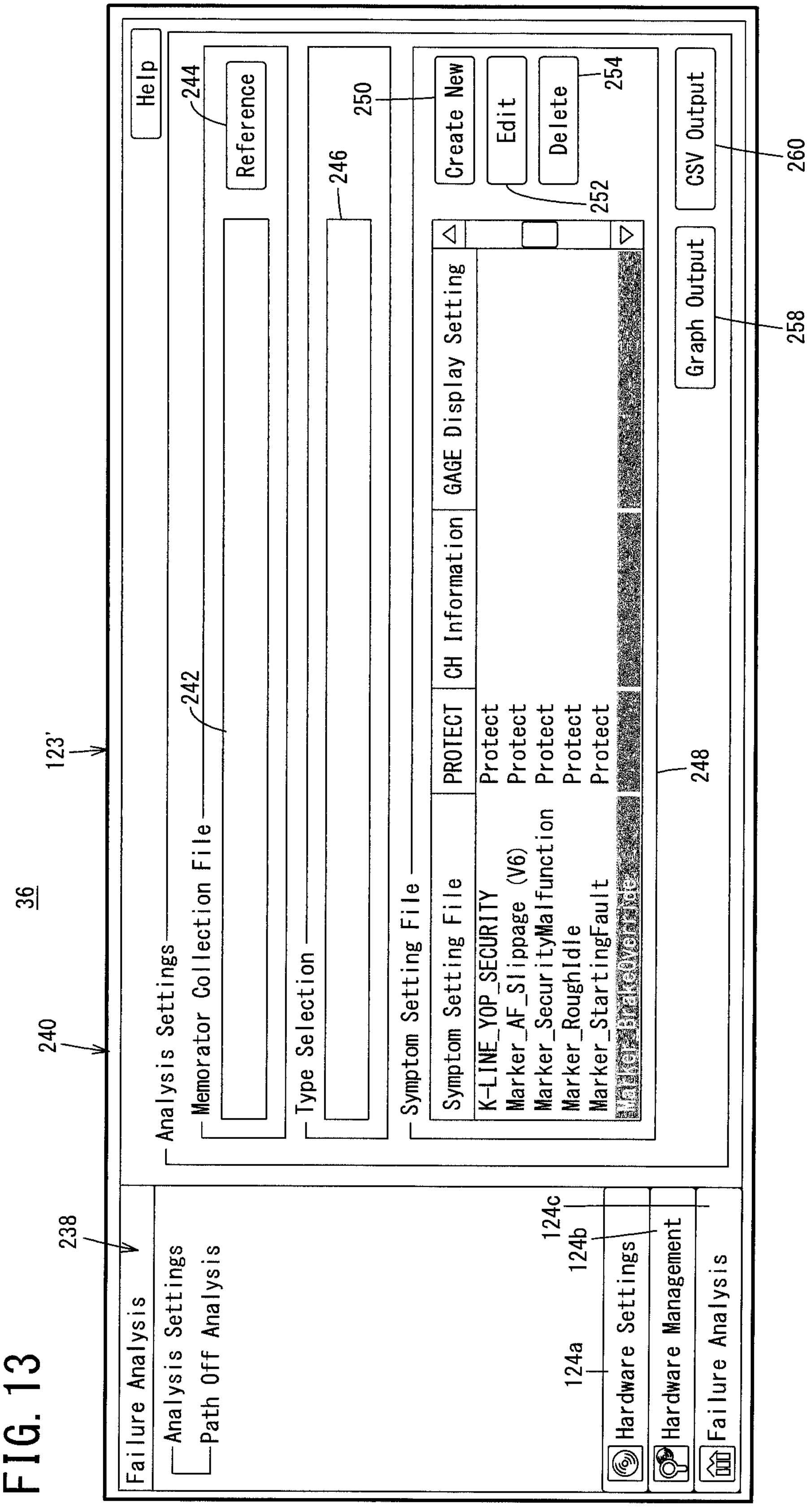
FIG. 13 is a view showing a screen including the symptom setting file selecting section.

An operation of selecting analysis files 34*a* and driving parameters P performed in step S8 of FIG. 4 will be described with reference to FIGS. 11 through 13. FIG. 11 and FIG. 13 are views showing the operation screen 123' including a symptom setting file selecting section 240. FIG. 12 is a view showing a file creation screen 270.

(3-4-1. Operation Screen 123')

The operation screen 123' is displayed on the display unit 36 by the operator operating the input unit 30. A description will now be given of the operation screen 123'. As shown in FIG. 11, the operation screen 123' includes the menu selection buttons 124*a* to 124*c*, a menu 238, and a symptom setting file selecting section 240. The symptom setting file selecting section 240 is displayed if the button 124*c* (see FIG. 5) is operated.

The symptom setting file selecting section 240 includes a file field 242, a reference button 244, a type selection field 246, a symptom setting file list 248 (hereinafter also referred to as a “file list 248”), a create new button 250, an edit button 252, a delete button 254, a graph output button 258, and a CSV output button 260.

The reference button 244 is a button that is operated by the operator. When the operator operates the reference button 244 via the input unit 30, a list of the analysis files 34*a* is displayed on a separate screen (not shown). When the operator selects one analysis file 34*a* from the list via the input unit 30, the file field 242 displays a name (file name) of the selected analysis file 34*a*. The type selection field 246 displays a type name of the selected file.

The file list 248 displays a list of the diagnostic files 34*b* (see FIG. 1). The file names of the respective diagnostic files 34*b* serve as identification names of diagnostic symptoms, and information (a diagnostic set) indicating one or more driving parameters P in relation to the file name is stored in each of the diagnostic files 34*b*. When any one of the identification names of the diagnostic symptoms displayed in the file list 248 is selected via the input unit 30, the identification name is highlighted.

The respective driving parameters P set in the diagnostic files 34*b* are selected and set so that information in relation to diagnostic symptoms concerning, for example, several hundreds of driving parameters P from within the collected data Dc (analysis files 34*a*) collected based on the marker conditions Mc is carefully selected, and can be displayed for easy comparison and evaluation. From this standpoint, normally, there are many cases in which the diagnostic files 34*b* are set by combining several driving parameters P selected based on the marker conditions Mc, and several related parameters thereof.

The create new button 250 is a button for the purpose of newly creating a diagnostic file 34*b*. The edit button 252 is a button for creating a diagnostic file 34*b* on the basis of a previously existing file. The delete button 254 is a button for deleting a diagnostic file 34*b*. The create new button 250 is also used when reading in a previously existing diagnostic file 34*b*, and deleting or adding the driving parameters P therein.

The graph output button 258 is a button for executing a graphical display program for graphically displaying on the display unit 36 the parameter data Dp of the driving parameters P. The CSV output button 260 is a button for saving the parameter data Dp of the driving parameters P in a CSV (comma separated value) file.

There are two methods of specifying graphs to be displayed or output. One is a method of selecting a previously existing diagnostic file 34*b* that is in the file list 248. One is a method of newly creating a diagnostic file 34*b*. In the former case, the operator selects from the file list 248 one of the identification names of the diagnostic symptoms, and then operates the graph output button 258. In the latter case, the operator operates the create new button 250, and using the file creation screen 270 shown in FIG. 12, creates a diagnostic set including the driving parameters P considered to be related to the occurrence of a fault as a target to be diagnosed, and stores the created diagnostic set in a new diagnostic file 34*b*. In addition, the identification name of the new diagnostic file 34*b*, which is displayed in the symptom setting file selecting section 240, is selected, and the graph output button 258 is operated in order to initiate the graphical display program.

Upon doing so, the parameter data Dp of the driving parameters P specified by the diagnostic set of the diagnostic file 34*b* selected in the file list 248 are extracted from the analysis file 34*a* displayed in the file field 242, and a graph 284 of the parameter data Dp (see FIG. 14) is displayed.

(3-4-2. File Creation Screen 270)

FIG. 12 is a view showing the file creation screen 270. The file creation screen 270 is a screen for creating a diagnostic set to be saved in a new diagnostic file 34*b*. The file creation screen 270 includes a driving parameter list 272, check boxes 274, a file name input field 276, a save button 278, and a cancel button 280.

The driving parameter list 272 displays a list of driving parameters P which are capable of being selected. The check boxes 274 are input fields in which check marks are placed to indicate the driving parameters P to be selected. When a check mark is placed inside the check box 274 alongside a given driving parameter P, the driving parameter P is selected.

The file name input field 276 is a field for inputting an identification name of a diagnostic symptom as a file name for the diagnostic file 34*b* to be saved. The save button 278 is a button that is operated when saving the diagnostic file 34*b*. When the save button 278 is operated in a state in which a file name is input to the file name input field 276, and one or more check marks have been placed inside the check boxes 274, a diagnostic set made up from a combination of the marked driving parameters P is saved as a new diagnostic file 34*b*. In addition, as shown in FIG. 13, the file name of the newly created diagnostic file 34*b* is added to the file list 248. The operator can also select this file and display the data thereof in the form of a graph.

(3-5. Graphical Display)

FIG. 14 is a graph 284 showing parameter data Dp of five driving parameters P. The five driving parameters P are engine rotational speed, accelerator pedal operation amount, vehicle speed, throttle opening, and an ON/OFF signal of a brake switch. Such driving parameters P relate to control functions of the vehicle in relation to a “brake override”, and serve for diagnosing whether a “brake override” has been activated or not. The “brake override” is a function to operate the brake preferentially and close the throttle to suppress the engine rotational speed, in the event that the brake pedal is operated at the same time in a state with the accelerator pedal being depressed.

In the graph 284, the horizontal axes represent time (data collection date and time) [sec], and on the vertical axes, units of the respective driving parameters P are shown. In the graph 284, among the parameter data Dp included within the collected data Dc', parameter data Dp of the driving parameters P selected by the diagnostic file 34*b* are displayed for an extracted time period. In this instance, with reference to a point in time at which a marker M was added, pieces of parameter data Dp from 10 [sec] before to 20 [sec] after the point in time are displayed. Although in FIG. 14, an example is shown in which the respective pieces of the parameter data Dp are displayed as separate graphs, a plurality of pieces of parameter data Dp may be displayed on one screen with the time axes thereof aligned.

On the basis of the graph 284, the operator can diagnose diagnostic symptoms or malfunctions and the like. A detailed example of such a diagnosis will now be described. Consider a case in which the dealer receives a complaint from the user that "the engine speed does not increase despite depressing the accelerator pedal". The operator sets marker conditions Mc assuming a driving situation in which the phenomenon of the complaint is likely to occur, and selects only the driving parameters P selected by the symptom setting file of the file list 248 from among the extracted parameter data Dp. Such data is displayed as a graph 284, and a diagnosis is attempted.

According to the present embodiment, the operator verifies the situation by asking the user additional various questions about the complaint, and information is obtained such as, for example, "running feels jerky" or "it seems to differ from an AT shift shock (a shock occurring at the time of an automatic speed change)", etc. From such information, it is assumed that there is not a malfunction, but rather, that a "brake override" operation has taken place. For this reason, the operator selects the file name 142*a* of "BrakeOverride" from the file list 142 (see FIG. 6) as a marker condition Mc, and the marker condition Mc is set with the content of the marker conditions list 131 corresponding to the marker conditional expression field 127 displayed in the marker conditions display section 126 (see FIG. 7). In addition, the graph 284 is investigated, and since it is possible to confirm the point at which the "brake override" was activated, it can be judged that the current complaint does not involve a malfunction.

For example, from the graph 284 shown in FIG. 14, the operator can read-in the driving operational status of the user, as in the following items (1) to (3), and as a result, the point where the "brake override" takes place can be confirmed:

(1) In a condition with the brake pedal being stepped on and the vehicle speed gently decelerating (brake switch ON), the accelerator pedal is depressed together with the brake pedal, and the throttle opening starts to rise.

Next, (2) the brake pedal is momentarily released due to removal of the foot from the brake pedal or the like, and thereafter stepped on again (brake switch goes from OFF to ON). At this time, in a state with the accelerator pedal being depressed, the brake pedal is depressed, and thus both the pedals are operated simultaneously (the operating condition of the "brake override" is completed), priority is given to braking, and the throttle is forcibly closed.

Next, (3) after a state in which the brake pedal has been released while the accelerator pedal is being depressed (a final determination position of the brake switch going from ON to OFF), the throttle opening gradually increases to a degree of opening corresponding to the operated amount of the accelerator pedal.

On the basis of the above investigative results, the operator presents the graph 284 to the user, and together therewith, is capable of providing an explanation such as, "The cause is due to operation of a rarely occurring safety function, which takes place during an operation that is not normally performed, that is, an operation of stepping on the accelerator pedal while the brake pedal remains in a depressed state". Therefore, the user can easily be made to understand that a malfunction has not occurred.

In the foregoing manner, according to the present embodiment, since it is possible to ascertain the changing state of respective driving parameters P before and after marker conditions Mc are satisfied, the embodiment is suitable for performing a failure analysis.

[4. Summary of First Embodiment]

The diagnostic device 16 is equipped with the storage unit 34 (condition setting file 34*c*) in which, for each of symptoms (diagnostic symptoms) to be diagnosed, there are stored beforehand driving parameters P related to the symptom and judgment conditions of the driving parameters P in association with each other, the marker condition setting function 84 (marker condition setting unit) which selects any one from among the diagnostic symptoms stored in the storage unit 34, and sets the judgment conditions of the driving parameters P associated with the selected diagnostic symptom as a marker condition Mc for adding a marker M to the time axis of the collected data Dc, the marking function 86 (marking unit) which adds the marker M to a piece of the collected data Dc at a point in time when the marker condition Mc is satisfied, and the data extraction function 102 (data extraction unit) which extracts the collected data Dc that was generated (took place) within a predetermined time range before and after the marker M.

According to the present embodiment, when analyzing a large amount of driving parameter data Dp collected by the data collecting device 18, with reference to information of a malfunction obtained from a user of a faulty vehicle and/or assuming in advance a driving condition or the like desired to be verified, by setting marker conditions Mc with respect to the driving parameter data Dp collected by the data collecting device 18, only data for which analysis is desired can be extracted as an analysis file 34*a* of a target to be analyzed. Therefore, there is no need to check the collected data Dc sequentially from a collection starting point, it is possible to preferentially check only the extracted portion, and the amount of effort and man-hour required for analyzing the driving parameter data Dp can significantly be reduced.

Further, the diagnostic device 16 selects any one from among the symptoms stored in the (condition setting file 34*c* of the) storage unit 34, and the judgment conditions of the driving parameters P associated with the selected symptom is set as a marker condition Mc for adding a marker M to the collected data Dc. Therefore, it is possible to easily extract driving parameter data Dp corresponding to the diagnostic symptom.

Further, the diagnostic device 16 extracts the collected data Dc for each marker M and stores the collected data in the analysis file 34*a*, whereas the collected data Dc stored in the data collecting device 18 remains unchanged. Therefore, when the extracted collected data Dc' is inappropriate, and it is necessary to set markers M again under different conditions, it is possible to extract the data any number of times under different conditions. Accordingly, repetitive analysis is facilitated, and it is possible to perform an efficient analysis of troublesome malfunctions.

The marker condition setting function 84 collates the driving parameters P associated with the selected symptom with the driving parameters P included in the collected data Dc, and sets as the marker condition Mc the judgment condition of the driving parameter P for which the result of the collation matched. In accordance with this configuration, the driving parameters P, which are stored in advance in association with symptoms, are collated with the driving parameters P included in the collected data Dc. Therefore, it is possible to avoid making a mistaken setting, in which the marker condition Mc is not satisfied so that data cannot be extracted, due to setting of driving parameters P not included within the collected data Dc.

The diagnostic device 16 is further equipped with a data storage function 104 (data storage unit) which stores the collected data Dc extracted by the data extraction function 102 in an analysis file 34*a* for each of the markers M. In accordance with this configuration, since an analysis file 34*a* is created for each of the markers M, it is possible to appropriately select and analyze the driving parameter data Dp in each of the analysis files 34*a*.

The diagnostic device 16 is further equipped with a time range setting function 88 (time range setting unit) which independently sets respectively, within the predetermined time range, a time range before the marker M and a time range after the marker M. In accordance with this configuration, since a time range before the marker M and a time range after the marker M are respectively and independently set within the predetermined time range within which the collected data Dc is extracted, it is possible to set an appropriate time range corresponding to the circumstances of the malfunction.

B. Other Embodiment 1 of First Embodiment

In the above-described embodiment, an example was described in which one marker condition Mc is set, and a fault diagnosis is performed based thereon. In the present invention, it is possible to set two or more marker conditions Mc. In that case, for example, in the marker condition setting function 84, marker conditions Mc are set independently for each of the diagnostic symptoms. Further, in the data storage function 104, a group of analysis files 34*a* classified for each of the diagnostic symptoms is created. Further, in step S7 of FIG. 4, a determination is performed as to whether or not to add the marker conditions Mc. In accordance with this configuration, since the marker conditions Mc can be independently set for each of a plurality of symptoms, it is possible to carry out the extraction operation of the collected data Dc in a comprehensive manner.

C. Other Embodiment 2 of First Embodiment

In the above embodiment, an example was described in which the marker conditions Mc include an A group in which the judgment conditions of the driving parameters P are combined with an "and" condition, and a B group in which the judgment conditions are combined with an "or" condition. In the present invention, it is possible to set other conditions to the marker conditions Mc. For example, the marker conditions Mc may include a condition duration time or a computational formula.

For example, a duration time over which conditions to be judged remain satisfied, and during which the conditions of the A group and/or the B group are satisfied, may be set. Further, in addition to the duration time, the number of times that the conditions are satisfied may be set. Further, a computational formula using one or more driving parameters P may be set. Further, a computational formula for calculating a rate of change of the driving parameters P may be set.

D. Other Embodiments of First Embodiment

Various other embodiments apart from the above-described embodiment are possible. For example, the diagnostic file 34*b* may be created together with setting of the marker conditions Mc. In this case, for example, at the time that the analysis execution button 136 shown in FIGS. 5 and 7 is operated, the driving parameters P of the A group and the B group shown in the conditions list 131 can make up the diagnostic set.

E. Second Embodiment

[1. Configuration]

In the first embodiment, preset marker conditions Mc are used. In contrast thereto, in the second embodiment, the operator sets the marker conditions Mc. Hereinafter, among the features of the second embodiment, constituent elements, screens, and operations thereof, which are the same as those in the first embodiment, will be omitted, and only the constituent elements, screens, and operations thereof that differ from those of the first embodiment will be described.

The configuration of the vehicle diagnostic system 14 according to the second embodiment is of substantially the same configuration as the vehicle diagnostic system 14 according to the first embodiment shown in FIGS. 1 and 2.

Figure 15:
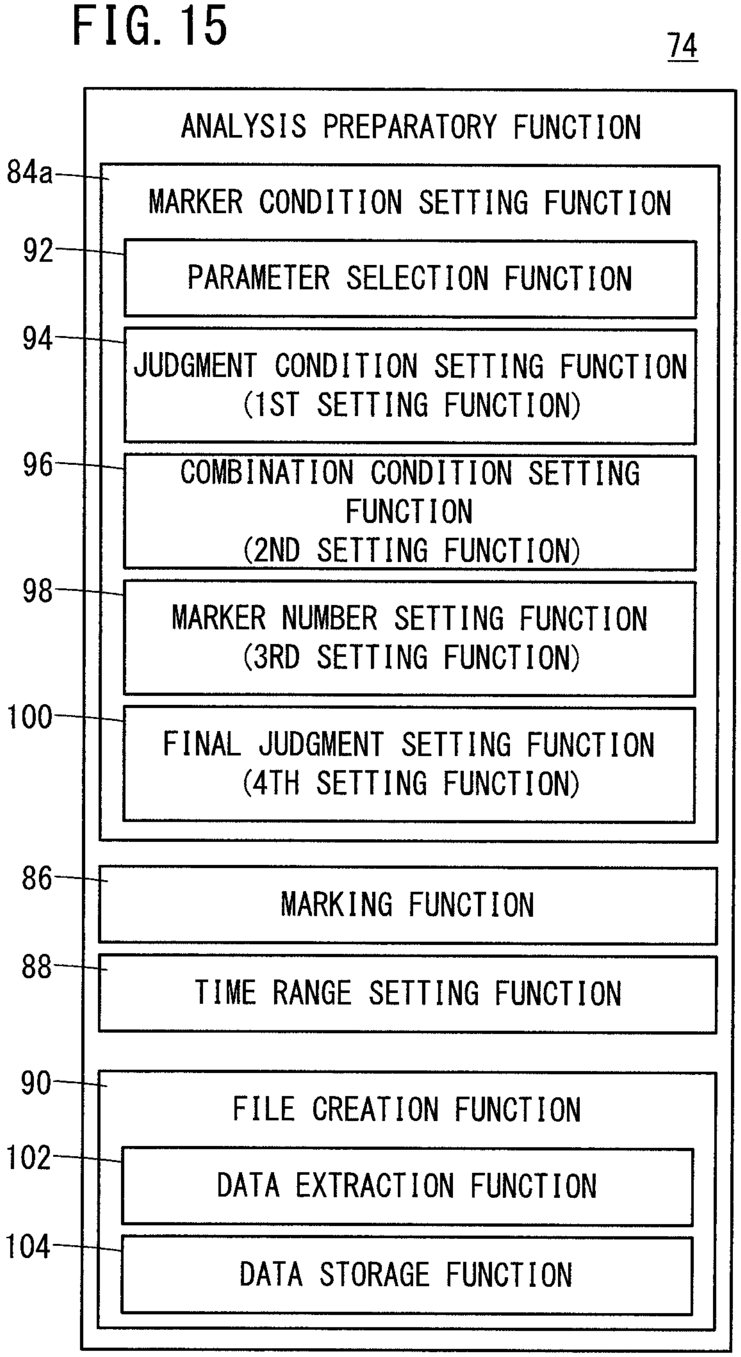
FIG. 15 is a view showing various functions of an analysis preparatory function possessed by a diagnostic device of a second embodiment.

As shown in FIG. 15, the analysis preparatory function 74 of the second embodiment includes a marker condition setting function 84*a*, a marking function 86, a time range setting function 88, and a file creation function 90. The marker condition setting function 84*a* of the second embodiment differs slightly from the marker condition setting function 84 of the first embodiment. A description thereof will be presented below.

The marker condition setting function 84*a* is a function for setting marker conditions Mc. In the marker condition setting function 84*a*, an input screen is displayed on the display unit 36, and input items, which are input or selected by way of the input unit 30, are stored as marker conditions Mc in the storage unit 34. The marker condition setting function 84*a* further includes, as functions for setting the marker conditions Mc, a parameter selection function 92, a judgment condition setting function 94, a combination condition setting function 96, a marker number setting function 98, and a final judgment setting function 100.

The parameter selection function 92 is a function for selecting driving parameters P to be placed in the marker conditions Mc. The judgment condition setting function 94 (hereinafter also referred to as a "first setting function 94") is a function for setting judgment conditions of the driving parameters P selected by the parameter selection function 92. The combination condition setting function 96 (hereinafter also referred to as a "second setting function 96") is a function of setting combination conditions ("and" conditions, "or" conditions, etc.) of a plurality of driving parameters P, in the event that a plurality of driving parameters P have been selected by the parameter selection function 92. The marker number setting function 98 (hereinafter also referred to as a "third setting function 98") is a function for setting an upper limit number Mmax of the number of markers M to be added to the collected data Dc. The final judgment setting function 100 (hereinafter also referred to as a "fourth setting function 100") is a function for setting a driving parameter P (hereinafter referred to as a "final judgment parameter P") which is determined lastly in the first setting function 94, in the event that a plurality of driving parameters P are selected by the parameter selection function 92. In the marker condition setting function 84*a*, satisfaction of a judgment condition of the final judgment parameter P, after the judgment conditions of the driving parameters P excluding the final judgment parameter P from among the driving parameters P included in the combination condition have been satisfied, is set as a condition by which the marker condition Mc is satisfied. The first setting function 94, the second setting function 96, and the fourth setting function 100 are functions for the purpose of setting the marker conditions Mc.

[2. Setting of Marker Conditions Mc]

(2-1. Details Setting Screen 340)

As noted above, when the details setting button 134 is operated in a state with the operation screen 123 shown in FIG. 5 displayed, the details setting screen 340 shown in FIG. 16 is displayed. The details setting screen 340 is a screen for setting the marker conditions Mc in detail.

As shown in FIG. 16, the details setting screen 340 includes a details setting section 342, a general settings button 346, an A group setting button 348, a B group setting button 350, an OK button 370, and a cancel button 372.

The details setting section 342 displays setting items of the marker conditions Mc. The displayed content of the details setting section 342 transitions in accordance with operations of the respective setting buttons 346, 348, 350.

The general settings button 346 is a button for causing the setting content 342*a* shown in FIG. 16 to be displayed in the details setting section 342. The setting content 342*a* will be described later. The A group setting button 348 is a button for causing the setting content 342*b* shown in FIG. 17 to be displayed in the details setting section 342. The setting content 342*b* will be described later. The B group setting button 350 is a button for causing the setting content 342*c* shown in FIG. 18 to be displayed in the details setting section 342. The setting content 342*c* will be described later.

Figure 17:
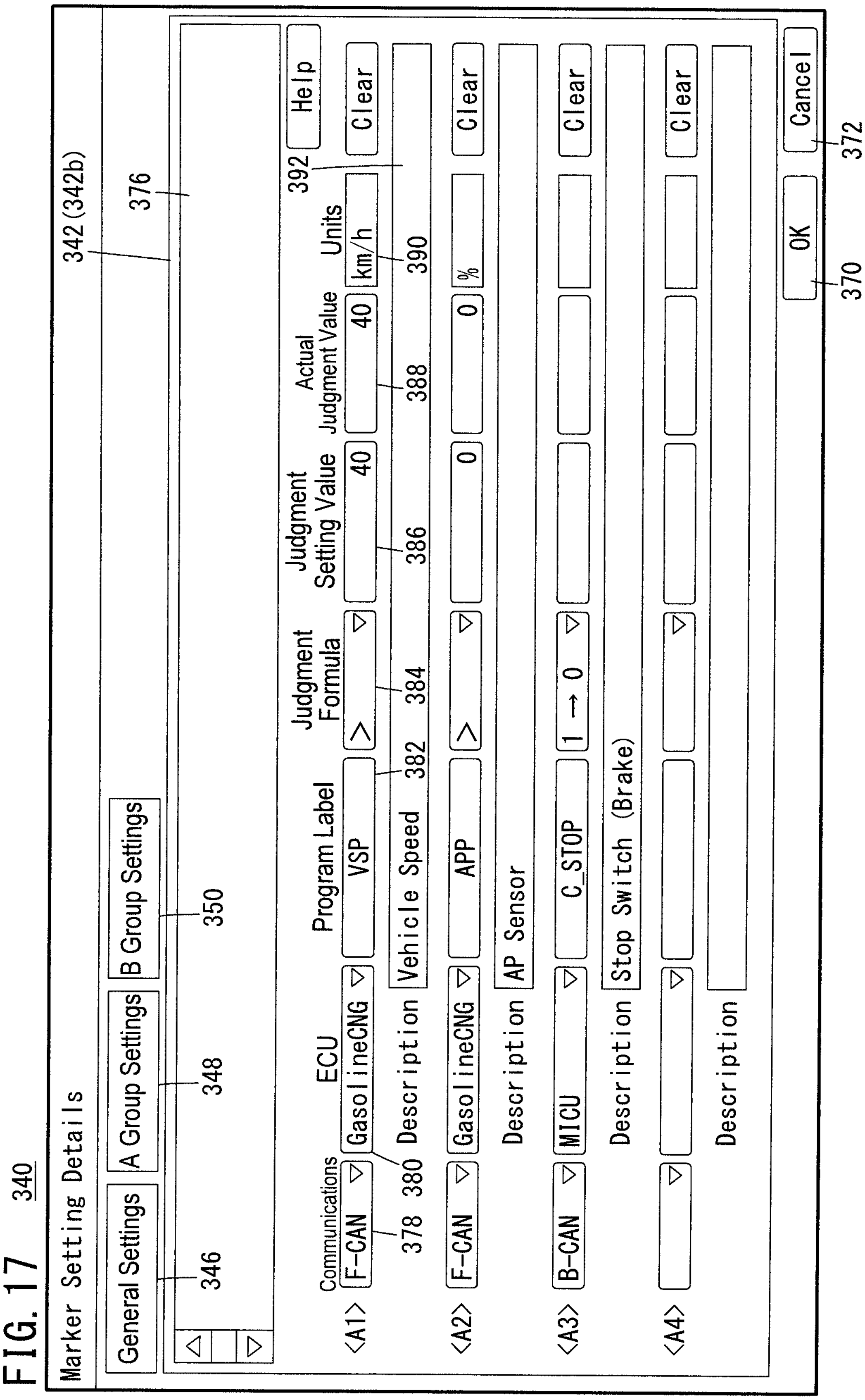
FIG. 17 is a diagram showing a detailed setting screen for setting individual conditions that make up the marker conditions.
Figure 18:
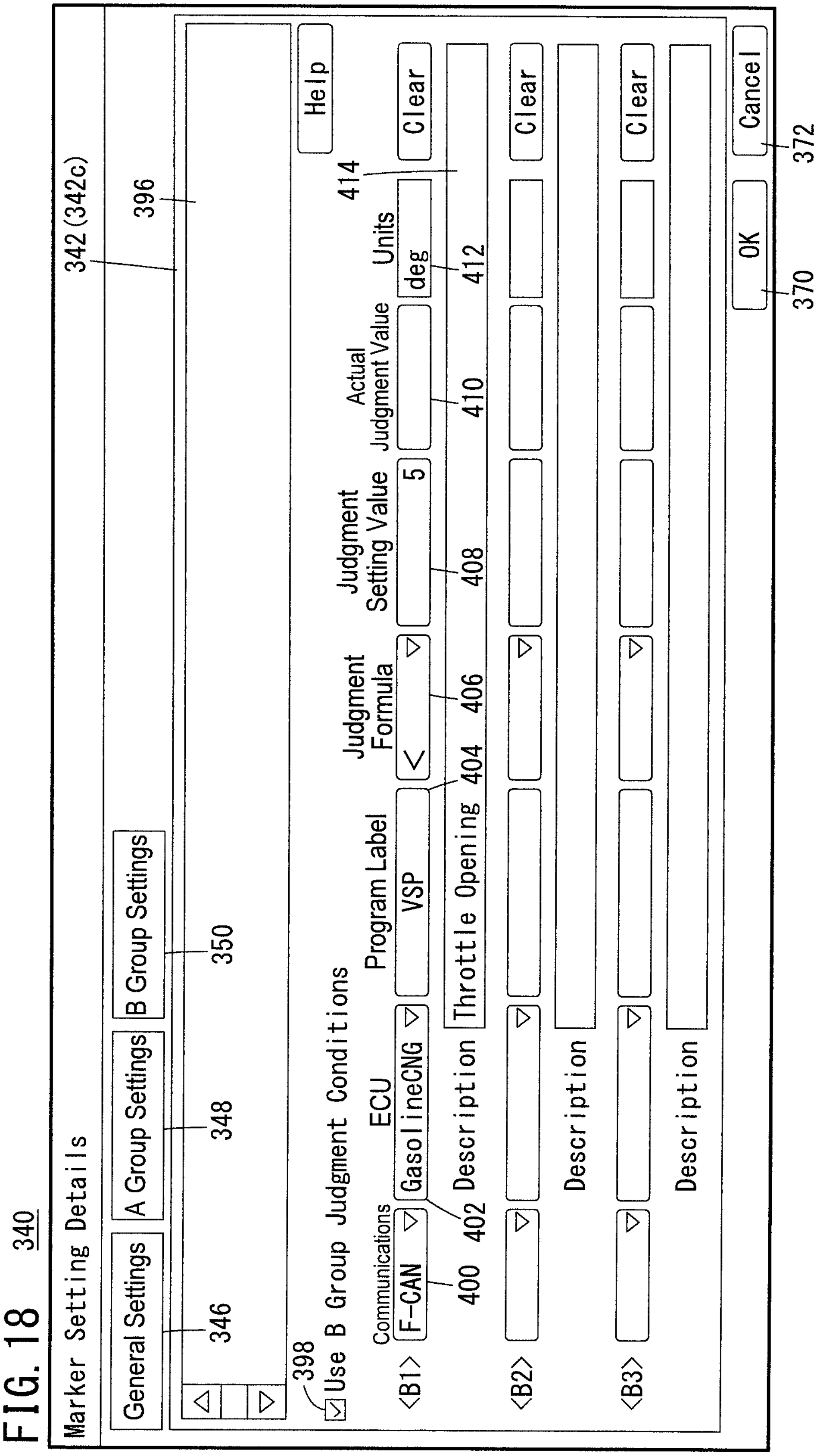
FIG. 18 is a diagram showing a detailed setting screen for setting individual conditions that make up the marker conditions.

The OK button 370 is a button for confirming the marker conditions Mc set by the details setting section 342. When the OK button 370 is operated by the operator, the marker conditions Mc set by the setting content 342*a* to 342*c* shown in FIGS. 16 through 18 is checked, and if there are no errors therein, the setting content is confirmed. After such confirmation, the details setting screen 340 is closed, and the operation screen 123 (see FIG. 5) including the marker conditions display section 126 shown in FIG. 7 is displayed. The cancel button 372 is a button for canceling setting of the marker conditions Mc.

(2-1-1. Setting Content 342*a*)

The setting content 342*a* shown in FIG. 16 includes a memo field 358, extraction time period setting fields 360, 362, a marker number setting field 364, and a final judgment setting field 366. The memo field 358 displays a simplified description (not shown) of the setting content 342*a*.

The extraction time period setting fields 360, 362 include buttons for setting time widths during which the collected data Dc' is extracted (also referred to as "cut out"). The extraction time period setting field 360 includes a button for setting a time range before the point in time at which the marker M was added, and the extraction time period setting field 362 includes a button for setting a time range after the point in time at which the marker M was added. When the buttons of the extraction time period setting fields 360, 362 are operated, pull-down menus (not shown) are displayed in which a plurality of time candidates are arranged alongside one another. In each menu, one time period from among the plurality of candidates can be selected. The selected time periods are displayed in the extraction time period setting fields 360, 362.

The marker number setting field 364 includes a button for setting an upper limit number Mmax of the number of markers M added to the collected data Dc. When the button of the marker number setting field 364 is operated, a pull-down menu (not shown) is displayed in which a plurality of candidates for the upper limit number Mmax are arranged alongside one another. One upper limit number Mmax from among the plurality of candidates can be selected. The selected upper limit number Mmax is displayed in the marker number setting field 364.

The final judgment setting field 366 includes a button for setting a final judgment parameter P from among the driving parameters set in the A group and the B group. When the button of the final judgment setting field 366 is operated, a pull-down menu (not shown) is displayed in which the characters A1 to A4 and the character groups B1 to B3 are arranged alongside one another. One of such characters therefrom can be selected. The selected character or character group is displayed in the final judgment setting field 366.

The final judgment parameter P need not necessarily be set, if it is not necessary to designate a final judgment timing for any one from among the respective driving parameters P that have been set. If such a setting is not made, regardless of the order, the marker conditions Mc are added at points in time when the conditions of the respective driving parameters P are met.

(2-1-2. Setting Content 342*b*)

In the setting content 342*b* shown in FIG. 17, it is possible to individually set the judgment conditions (A1 to A4) of four driving parameters P. The judgment conditions A1 to A4 that are set by the setting content 342*b* are combined with an "and" condition (A1 and A2 and A3 and A4). Stated otherwise, the judgment condition for the A group is satisfied at a stage when all of the judgment conditions A1 to A4 have been satisfied. Moreover, according to the present embodiment, setting of a driving parameter P to any of A1 to A4 is essential.

The setting content 342*b* includes a memo field 376, a communications setting field 378, an ECU setting field 380, a driving parameter setting field 382, a judgment condition setting field 384, a judgment setting value input field 386, an actual judgment value field 388, a units field 390, and a description field 392. Further, from the standpoint of facilitating viewing of the drawing, in FIG. 17, reference numerals are provided only for the respective fields 378, 380, 382, 384, 386, 388, 390, 392 of the judgment condition A1, and reference numerals are not provided for the respective fields 378, 380, 382, 384, 386, 388, 390, 392 of the judgment conditions A2 to A4.

The memo field 376 displays a simplified description (not shown) of the setting content 342*b*. The communications setting field 378 includes a button for setting a communications standard. When the button of the communications setting field 378 is operated, a pull-down menu (not shown) is displayed in which a plurality of candidates for the communications standard (F-CAN, B-CAN, K-LINE, etc.) are arranged alongside one another. One from among the communications standards can be selected. The selected communications standard is displayed in the communications setting field 378.

The ECU setting field 380 includes a button for setting an ECU. When the button of the ECU setting field 380 is operated, a pull-down menu (not shown) is displayed in which a plurality of ECU candidates are arranged alongside one another. One ECU from among the candidates can be selected. The selected ECU is displayed in the ECU setting field 380. In the pull-down menu in which the ECU candidates are arranged alongside one another, there are displayed only the ECUs 20 in the vehicle 12 which are connected by the communications standard set in the communications setting field 378, and that serve as collection destinations from which the parameter data Dp included in the collected data Dc are collected.

The driving parameter setting field 382 includes a button for setting the driving parameters P to be placed in the marker conditions Mc. When the button of the driving parameter setting field 382 is operated, a list (not shown) in which a plurality of candidates for the driving parameters P are arranged alongside one another is displayed on another screen. When the operator operates the input unit 30 to designate any one of the driving parameters P, the designated driving parameter P is selected. A program label corresponding to the selected driving parameter P is displayed in the driving parameter setting field 382.

In a list displayed on a separate screen, there are included names of all of the driving parameters P that are capable of being acquired by vehicles 12 of each vehicle type. When the data collecting device 18 is connected to the diagnostic device 16 through the data link cable 58, information of the driving parameters P included in the collected data Dc is transmitted from the data collecting device 18 to the diagnostic device 16. The computation unit 32 (parameter selection function 92) of the diagnostic device 16 collates the information (type information) of the driving parameters P transmitted from the data collecting device 18 with the information (type information) of all of the driving parameters P that were stored beforehand in the storage unit 34. In addition, on a list screen, driving parameters P included in the collected data Dc are displayed normally, whereas driving parameters P not included in the collected data Dc are displayed in a grayed out fashion. The normally displayed driving parameters P are capable of being selected, whereas the driving parameters P displayed in a grayed out fashion are incapable of being selected. Moreover, there may simply be displayed only the selectable driving parameters P, and the driving parameters P that are incapable of being selected need not be displayed. In addition, the list may be shown in the form of a pull-down menu.

The judgment condition setting field 384 includes a button for setting judgment conditions of the driving parameters P. When the button of the judgment condition setting field 384 is operated, a pull-down menu (not shown) is displayed in which a plurality of judgment condition candidates are arranged alongside one another. One of the judgment conditions from among the plurality can be selected. The selected judgment condition is displayed in the judgment condition setting field 384. In the case that the driving parameters P set in the driving parameter setting field 382 are in the form of bit information, for example, if the driving parameters P are indicated by either 0 or 1, in the pull-down menu, judgment conditions are displayed including “0”, “1”, a time of change from “0” to “1”, and a time of change from “1” to “0”. On the other hand, in the event that the driving parameters P set in the driving parameter setting field 382 are in the form of information of two bits or more, in the pull-down menu, judgment conditions are displayed including an equal sign, an inequality sign (including greater than or equal, and less than or equal), a time of change from “Lo” to “Hi”, and a time of change from “Hi” to “Lo”.

The judgment setting value input field 386 is an input field for setting judgment values of the driving parameters P, and in which specific numerical values are input using a numeric keypad or the like. The judgment setting value input field 386 can be input with such numerical values, in the event that the driving parameters P set in the driving parameter setting field 382 are in the form of information of 2 bits or more.

The actual judgment value field 388 displays an actual judgment value, which is specified on the basis of the judgment value input to the judgment setting value input field 386. The units field 390 displays units of the driving parameters P set by the driving parameter setting field 382. The driving parameters P and the units therefor are associated with each other in advance. The description field 392 displays a description (names, etc.) of the driving parameters P set by the driving parameter setting field 382.

(2-1-3. Setting Content 342*c*)

In the setting content 342*c* shown in FIG. 18, it is possible to individually set the judgment conditions (B1 to B3) of three driving parameters P. The judgment conditions B1 to B3 that are set by the setting content 342*c* are combined with an “or” condition (B1 or B2 or B3). Stated otherwise, the judgment condition for the B group is satisfied at a stage when any one of the judgment conditions B1 to B3 has been satisfied.

The setting content 342*c* includes a memo field 396, a usage check box 398, a communications setting field 400, an ECU setting field 402, a driving parameter setting field 404, a judgment condition setting field 406, a judgment setting value input field 408, an actual judgment value field 410, a units field 412, and a description field 414. Further, from the standpoint of facilitating viewing of the drawing, in FIG. 18, reference numerals are provided only for the respective fields 400, 402, 404, 406, 408, 410, 412, 414 of the judgment condition B1, and reference numerals are not provided for the respective fields 400, 402, 404, 406, 408, 410, 412, 414 of the judgment conditions B2 and B3.

The memo field 396 displays a simplified description (not shown) of the setting content 342*c*. The usage check box 398 is a check box in which a check mark is placed when using the judgment conditions of the B group. In the case that a check mark is not placed in the usage check box 398, the judgment conditions of the B group are not included in the marker conditions Mc.

The respective fields 400, 402, 404, 406, 408, 410, 412, 414 are the same as the respective fields 378, 380, 382, 384, 386, 388, 390, 392 of the setting content 342*b* shown in FIG. 17. Thus, descriptions thereof are omitted.

(2-2. Setting Results)

In the details setting screen 340 shown in any of FIGS. 16 through 18, when the OK button 370 is operated, a checking process of the marker conditions Mc, which have been set using the details setting screen 340, is carried out. In this instance, the driving parameters P that are set using the details setting screen 340 (setting content 342*b*, 342*c*) are collated with the driving parameters P included in the collected data Dc. If the collation result matches, the setting information that was set using the details setting screen 340 (setting content 342*a* to 342*c*) is confirmed as the marker conditions Mc. At this time, the details setting screen 340 is closed. As shown in FIG. 7, in the marker conditions display section 126 of the operation screen 123, the marker conditions Mc that were set using the details setting screen 340 are displayed.

3. Summary of Second Embodiment

The diagnostic device 16 is equipped with the marker condition setting function 84*a* (marker condition setting unit) which sets marker conditions Mc for adding a marker M to the time axis of the collected data Dc, the marking function 86 (marking unit) which adds the marker M to a point in time when the marker conditions Mc are satisfied, and the file creation function 90 (file storage unit) which extracts the collected data Dc generated within a predetermined time range before and after the markers M, and stores the collected data Dc in analysis files 34*a* for each of the markers M. The marker condition setting function 84*a* comprises the parameter selection function 92 (parameter selection unit) that displays the driving parameters P included in the collected data Dc so as to enable selection thereof, the judgment condition setting function 94 (judgment condition setting unit) that sets a judgment condition for a driving parameter P selected by the parameter selection function 92, and the combination condition setting function 96 (combination condition setting unit) which, in the event that a plurality of driving parameters P are selected by the parameter selection function 92, sets a combination condition for the plurality of driving parameters P.

According to the present embodiment, when analyzing a large amount of driving parameter data Dp collected by the data collecting device 18, with reference to information of a malfunction obtained from a user of a faulty vehicle and/or assuming in advance a driving condition or the like desired to be verified, by setting marker conditions Mc with respect to the driving parameter data Dp collected by the data collecting device 18, only data for which analysis is desired can be extracted as an analysis file 34*a* of a target to be analyzed. Therefore, there is no need to check the collected data Dc sequentially from a collection starting point, it is possible to preferentially check only the extracted portion, and the amount of effort and man-hour required for analyzing the driving parameter data Dp can significantly be reduced.

Further, when setting the marker conditions Mc, the diagnostic device 16 displays the driving parameters P included in the collected data Dc to enable selection thereof. For example, a list of driving parameters P is displayed, and among such driving parameters, driving parameters P included in the collected data Dc are normally displayed and are capable of being selected, whereas other driving parameters P not included in the collected data Dc are displayed in a grayed out fashion or the like, whereby selection thereof is disabled. Therefore, the operator can easily select driving parameters P that are capable of being set.

Further, the diagnostic device 16 extracts the collected data Dc for each marker M, and stores the collected data in the analysis file 34*a*, whereas the collected data Dc stored in the data collecting device 18 remains unchanged. Therefore, when the extracted collected data Dc' is inappropriate, and it is necessary to set markers M again under different conditions, it is possible to extract the data any number of times under different conditions. Accordingly, repetitive analysis is facilitated, and it is possible to perform an efficient analysis of troublesome malfunctions.

The diagnostic device 16 is further equipped with a time range setting function 88 (time range setting unit) which independently sets respectively, within the predetermined time range, a time range before the marker M and a time range after the marker M. In accordance with this configuration, it is possible to set an appropriate time range corresponding to the circumstances of the malfunction.

Furthermore, the marker condition setting function 84*a* further comprises the marker number setting function 98 (marker number setting unit) for setting an upper limit number Mmax for the number of markers M, and the marking function 86 stops the process of adding markers M, in the event that the number of markers M added to the collected data Dc has reached the upper limit number Mmax. With this configuration, in the event that narrowing down by the marker conditions Mc is insufficient, the number of markers M reaches the upper limit number Mmax, whereupon the process of adding markers M is stopped. More specifically, as a result of the process of adding markers M being stopped, it can be grasped at an early stage that insufficient narrowing down by the marker conditions Mc has occurred. Therefore, it becomes easier to conduct an analysis in such a manner that conditions are added to the marker conditions Mc in a stepwise manner, and the marker conditions Mc are gradually narrowed down.

Furthermore, the marker condition setting function 84*a* comprises the final judgment setting function 100 (final judgment setting unit) that sets a final judgment parameter P for which the judgment condition is determined lastly, in the event that a plurality of the driving parameters P are selected by the parameter selection function 92. In addition, satisfaction of a judgment condition of the final judgment parameter P, after the judgment conditions of the driving parameters P excluding the final judgment parameter P from among the driving parameters P included in the combination condition have been satisfied, is set as a condition by which the marker condition Mc is satisfied. In accordance with this configuration, it is possible to extract data with reference to a point in time at which the judgment condition of the final judgment parameter P has been satisfied. By setting an important driving parameter P as the final judgment parameter P, it is possible to extract effective collected data Dc, even in the case that the extraction reference position within the sampling period of the collected data Dc is affected.

The diagnostic device 16 comprises the diagnostic file 34*b* (storage unit) in which there is stored combination information of the driving parameters P as a diagnostic set, for each symptom of the vehicle 12 to be diagnosed, the display selection function 106 (diagnostic set selection unit) for displaying and selecting an identification name of the diagnostic set, and the display control function 78 (display control unit) that extracts from the analysis files 34*a* the driving parameter data Dp corresponding to the selected diagnostic set, and displays the driving parameter data Dp on the display unit 36. In accordance with this configuration, when diagnosing the driving parameter data Dp stored in the analysis files 34*a*, from among the enormous amount of driving parameter data Dp stored in the analysis files 34*a*, it is possible to easily select driving parameter data Dp to be displayed for diagnosis.

F. Other Embodiment of Second Embodiment

In the above embodiment, an example was described including in the marker conditions Mc an A group in which the judgment conditions of the driving parameters P are combined with an “and” condition, and a B group in which the judgment conditions are combined with an “or” condition. It is possible to set other conditions to the marker conditions Mc. For example, as will be described below, the marker conditions Mc may include a condition duration time or a computational formula.

[1. Configuration]

Figure 19:
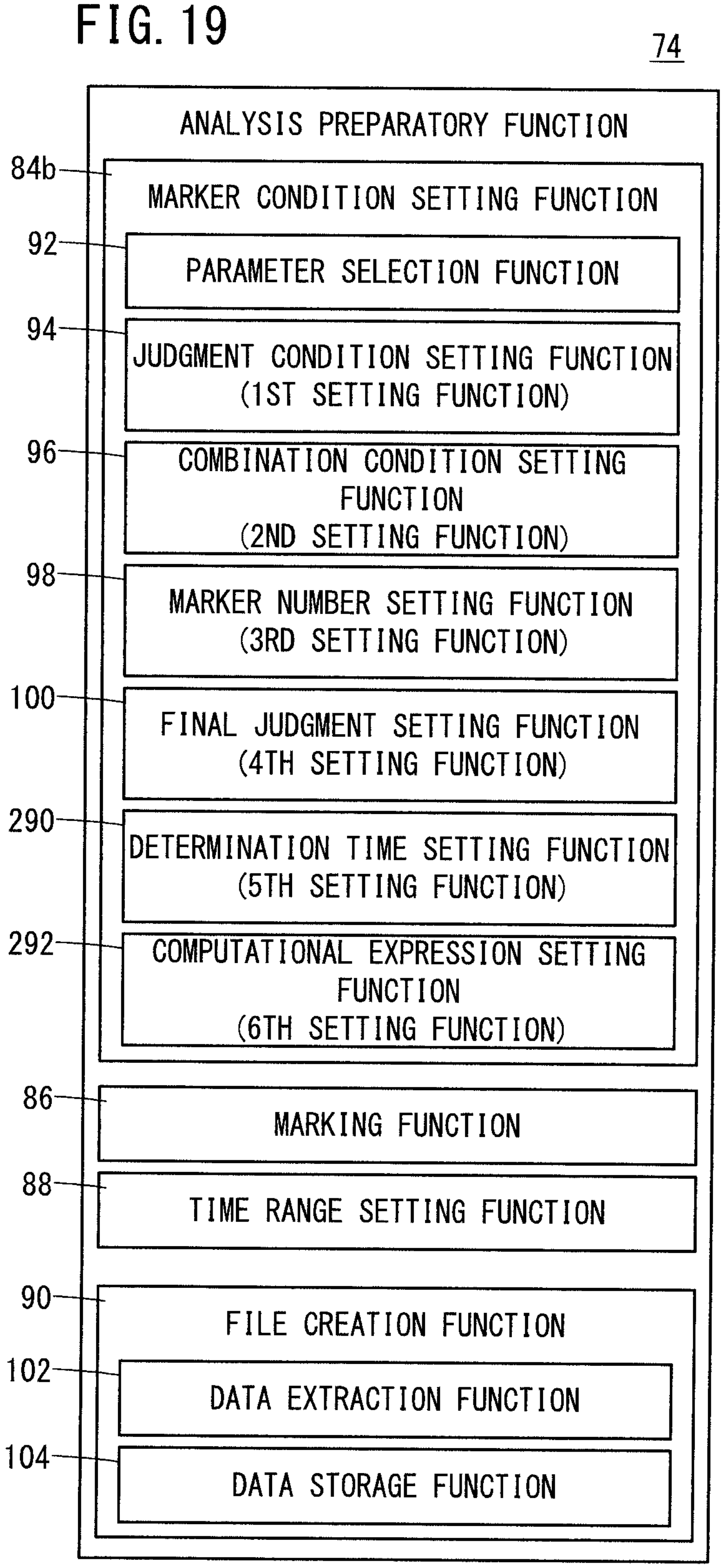
FIG. 19 is a view showing various functions of an analysis preparatory function possessed by the diagnostic device.

The diagnostic device 16 shown in FIG. 1 may include an analysis preparatory function 74 and a marker condition setting function 84*b* as shown in FIG. 19, instead of the analysis preparatory function 74 and the marker condition setting function 84*a* shown in FIG. 15. FIG. 19 is a view showing various functions of the analysis preparatory function 74 possessed by the diagnostic device 16. In FIG. 19, the same reference numerals are used to denote functions that are the same as those of the analysis preparatory function 74 shown in FIG. 15. The analysis preparatory function 74, in addition to the respective functions possessed by the analysis preparatory function 74, further includes a determination time setting function 290 and a computational expression setting function 292.

The determination time setting function 290 (hereinafter also referred to as a "fifth setting function 290") is a function to set a duration time over which conditions to be determined remain satisfied, when the conditions set by the first setting function 94 and the fourth setting function 100 have been satisfied. Moreover, in addition to the duration time, the number of times that the conditions are satisfied can be set. The computational expression setting function 292 (hereinafter also referred to as a "sixth setting function 292") is a function to set a computational expression. The fifth setting function 290 and the sixth setting function 292 are functions for the purpose of setting the marker conditions Mc.

[2. Setting of Marker Conditions Mc]

(2-1. Details Setting Screen 340')

In the present embodiment, setting of the marker conditions Mc is carried out using the setting screen of FIGS. 20 through 23. FIGS. 20 through 23 are views showing a details setting screen 340' for setting the marker conditions Mc. In FIGS. 20 through 23, the same reference numerals are used to denote components that are the same as the components of the details setting screen 340 shown in FIGS. 16 through 18.

Figure 20:
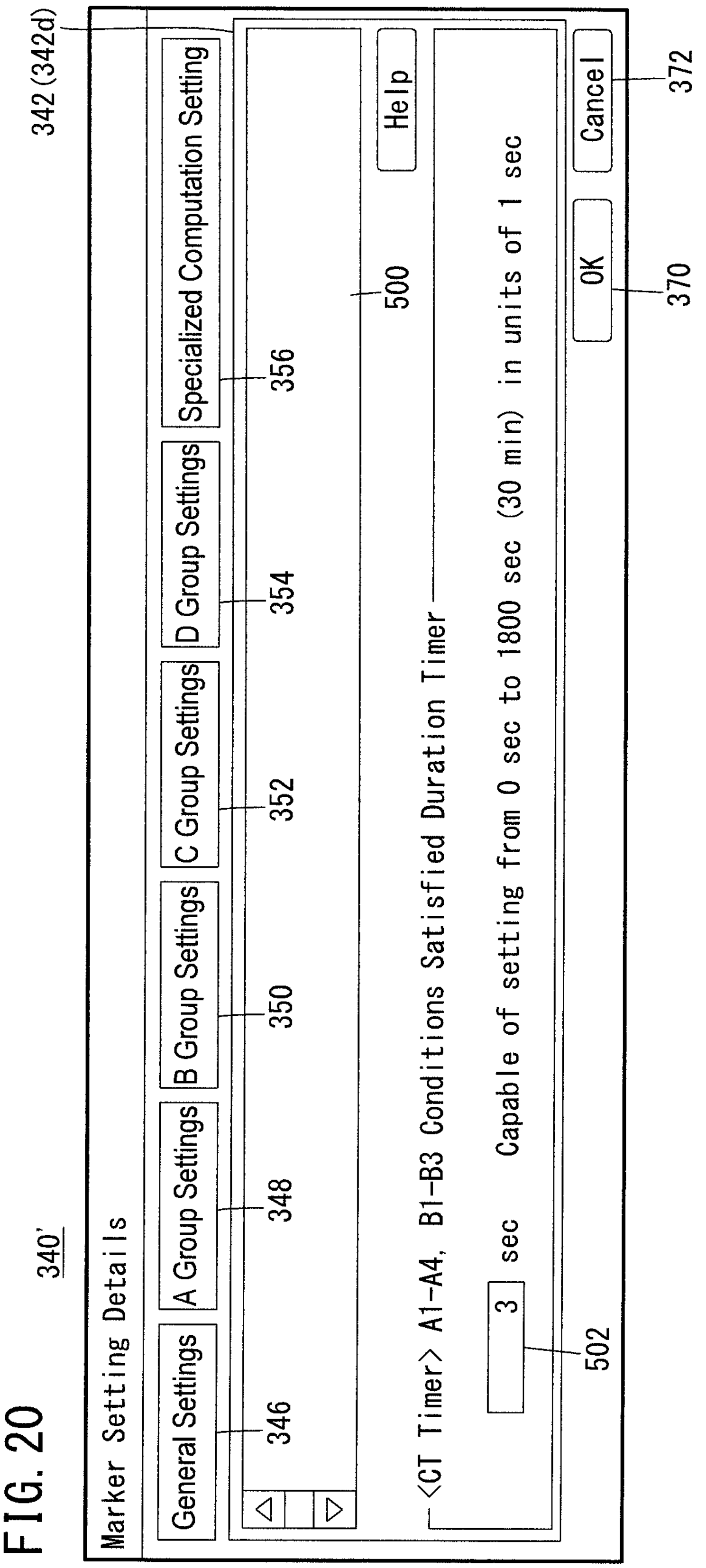
FIG. 20 is a view showing a detailed setting screen for setting marker conditions as well as other conditions.

As shown in FIG. 20, the details setting screen 340' includes a details setting section 342, a general settings button 346, an A group setting button 348, a B group setting button 350, a C group setting button 352, a D group setting button 354, a specialized computation setting button 356, an OK button 370, and a cancel button 372.

The C group setting button 352 is a button for causing the setting content 342*d* shown in FIG. 20 to be displayed in the details setting section 342. The setting content 342*d* will be described later. The D group setting button 354 is a button for causing the setting content 342*e* shown in FIG. 21 to be displayed in the details setting section 342. The setting content 342*e* will be described later. The specialized computation setting button 356 is a button for causing the setting content 342*f* shown in FIGS. and 23 to be displayed in the details setting section 342. The setting content 342*f* will be described later.

(2-1-1. Setting Content 342*d*)

The setting content 342*d* shown in FIG. 20 includes a memo field 500 and a duration time input field 502. The memo field 500 displays a simplified description (not shown) of the setting content 342*d*.

The duration time input field 502 is an input field for the purpose of setting a duration time that takes place after the judgment conditions of all of the driving parameters P set in the A group and the B group have been satisfied. A specific numerical value therefor is input using a numeric keypad or the like. The marker conditions Mc are determined to have been satisfied at a point in time at which the duration time has elapsed from satisfaction of all of the judgment conditions.

(2-1-2. Setting Content 342*e*)

Figure 21:
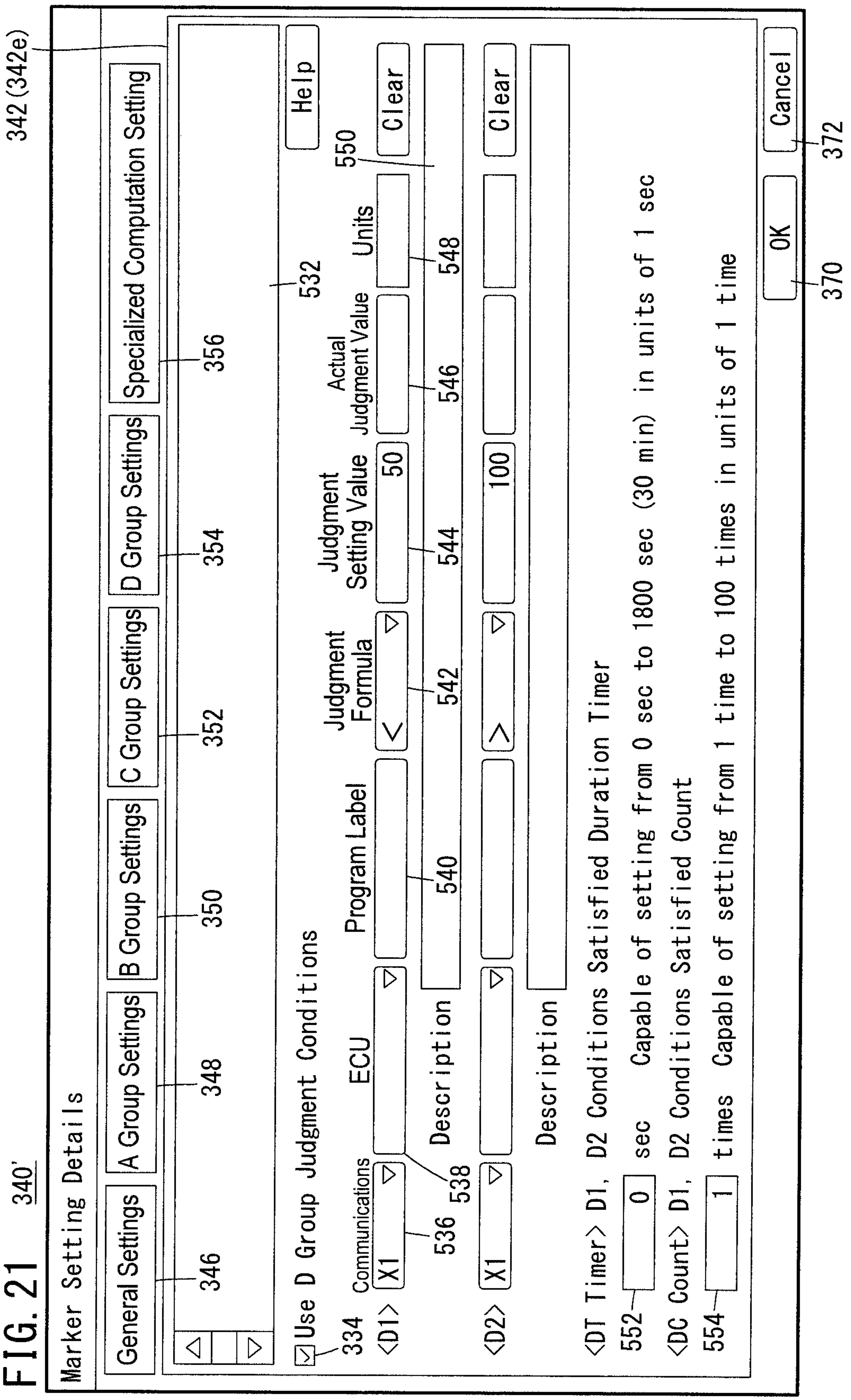
FIG. 21 is a view showing a detailed setting screen for setting marker conditions as well as other conditions.

In the setting content 342*e* shown in FIG. 21, it is possible to individually set the judgment conditions (D1, D2) of two driving parameters P. The judgment conditions D1, D2 that are set by the setting content 342*e* are combined with an "or" condition (D1 or D2). Stated otherwise, it is essential that either one of the judgment conditions D1, D2 be satisfied. Furthermore, in the setting content 342*e* shown in FIG. 21, there can be set a duration time from satisfaction of the "or" condition of the judgment condition D1, D2, and the number of times that the "or" condition is satisfied.

The setting content 342*e* shown in FIG. 21 includes a memo field 532, a usage check box 334, a communications setting field 536, an ECU setting field 538, a driving parameter setting field 540, a judgment condition setting field 542, a judgment setting value input field 544, an actual judgment value field 546, a units field 548, a description field 550, a duration time input field 552, and a counter input field 554. The memo field 532 displays a simplified description (not shown) of the setting content 342*e*.

The usage check box 334 is the same as the usage check box 398 shown in FIG. 18. Further, the respective fields 536, 538, 540, 542, 544, 546, 548, 550 are the same as the respective fields 378, 380, 382, 384, 386, 388, 390, 392 of the setting content 342*b* shown in FIG. 17. Thus, descriptions thereof are omitted.

The duration time input field 552 is an input field for the purpose of setting a duration time that takes place after the judgment conditions of the driving parameters P set by D1 or D2 have been satisfied. A specific numerical value therefor is input using a numeric keypad or the like. The counter input field 554 is an input field for the purpose of setting the number of times that the judgment conditions of the driving parameters P set by D1 or D2 have been satisfied. A specific numerical value therefor is input using a numeric keypad or the like. A value of one is added to the count value at a point in time at which the duration time set in the duration time input field 552 has elapsed from satisfaction of the judgment conditions of the driving parameters P set by D1 or D2. The marker conditions Mc are determined to be satisfied at a point in time when the count value reaches the number of times that the conditions are satisfied, as was set in the counter input field 554.

(2-1-3. Setting Content 342*f*)

Figure 22:
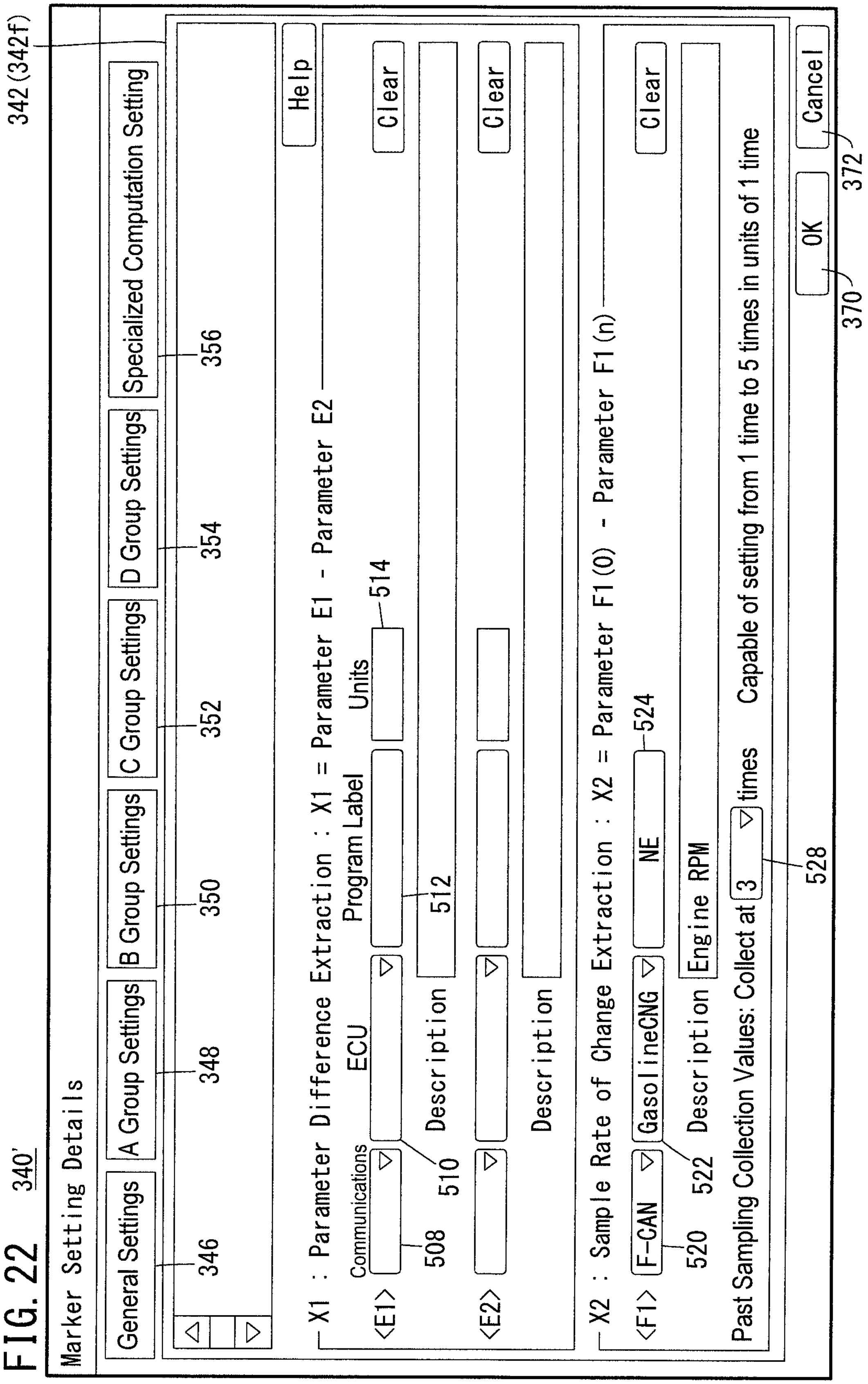
FIG. 22 is a view showing a detailed setting screen for setting marker conditions as well as other conditions.
Figure 23:
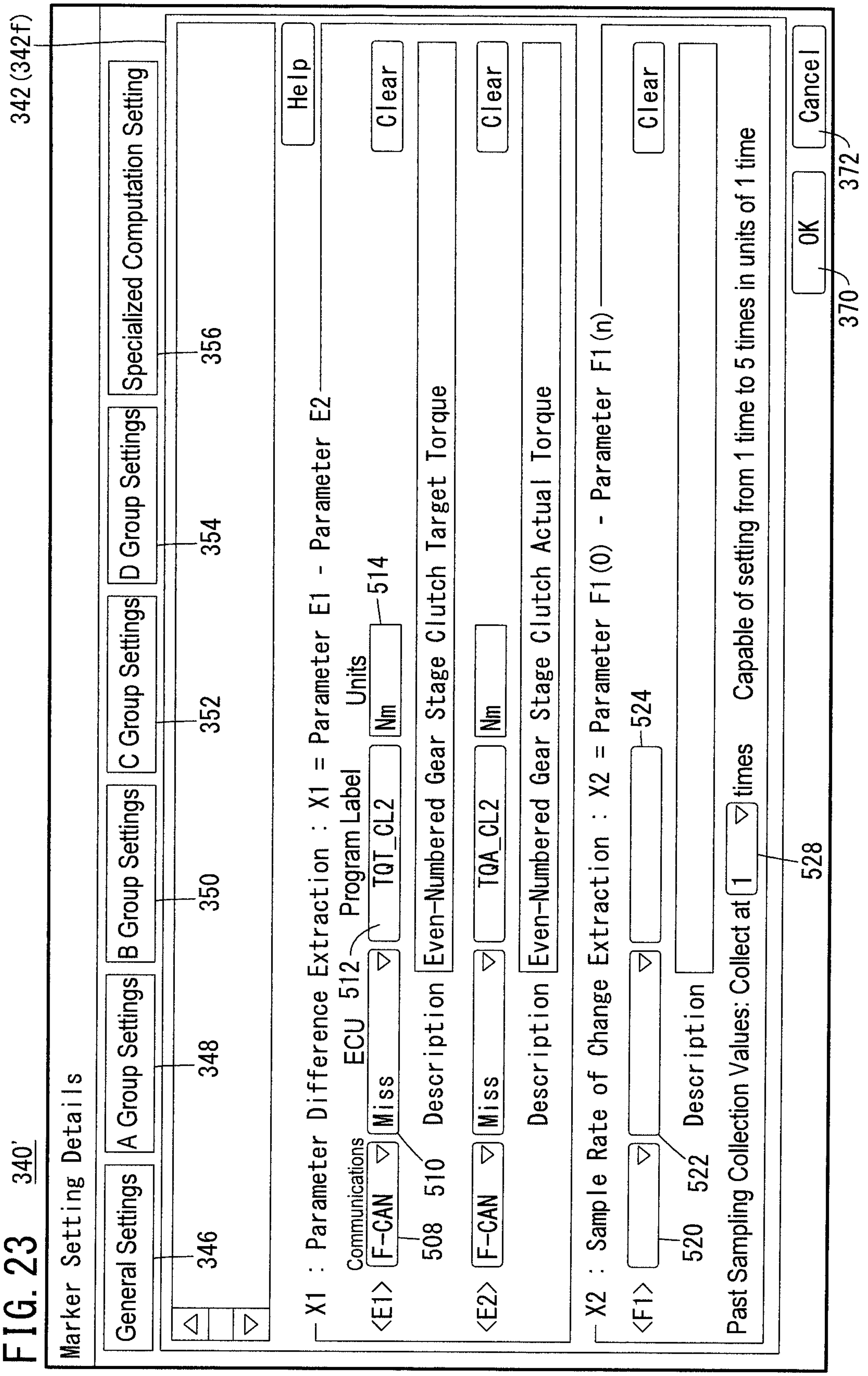
FIG. 23 is a view showing a detailed setting screen for setting marker conditions as well as other conditions.

In the setting content 342*f* shown in FIGS. 22 and 23, it is possible to individually set two computation conditions (X1, X2). In the computation condition X1, a subtraction calculation (E1−E2) of two driving parameters P (E1, E2) of the same type can be set. In the computation condition X2, a sampling number needed to calculate a rate of change of a driving parameter P (F1) can be set.

The two driving parameters P (E1, E2) used in calculating the computation condition X1 are set using a communications setting field 508, an ECU setting field 510, a driving parameter setting field 512, and a units field 514. The driving parameter P (F1) used in calculating the computation condition X2 is set using a communications setting field 520, an ECU setting field 522, and a driving parameter setting field 524. Further, a sampling number is set in a sampling number input field 528.

G. Other Embodiments of Second Embodiment

Various other embodiments apart from the above-described embodiments are possible. For example, the diagnostic file 34*b* may be created at a time of setting the marker conditions Mc. In this case, when the OK button 370 is operated on the details setting screen 340 shown in FIGS. 17 and 18, the driving parameters P included in the A group and the B group are set as a diagnostic set, and the diagnostic file 34*b* can be created thereby.

While the invention has been particularly shown and described with reference to preferred embodiments, it will be understood that variations and modifications can be effected thereto by those skilled in the art without departing from the scope of the invention as defined by the appended claims.

What is claimed is:

1. A vehicle diagnostic system comprising:

a vehicle diagnostic data collecting device configured to, in a state of being detachably connected from an exterior to an in-vehicle network having a plurality of electronic control units, transmit a data request signal for requesting driving parameter data indicative of operating states of respective components of a vehicle, to at least one target electronic control unit from among the plurality of electronic control units, receive the driving parameter data corresponding to the data request signal, and store the driving parameter data as collected data in association with a time axis; and a diagnostic device configured to perform a diagnosis of the vehicle based on the collected data stored in the data collecting device;

wherein the diagnostic device comprises a computation unit; and a storage unit including programs;

the storage unit and the programs configured to, with the computation unit, cause the diagnostic device at least to perform:

for each of symptoms to be diagnosed, store beforehand a driving parameter related to the symptom, and a judgment condition of the driving parameter, in association with each other;

select one from among the symptoms stored in the storage unit, and set a judgment condition of the driving parameter associated with the selected symptom as a marker condition for adding a marker to the time axis of the collected data;

set a final judgment parameter at which the judgment condition is determined lastly, in an event that a plurality of the driving parameters are selected;

satisfaction of a judgment condition of the final judgment parameter, after the judgment conditions of the driving parameters excluding the final judgment parameter from among the driving parameters included in the combination condition have been satisfied, is set as a condition by which the marker condition is satisfied;

add the marker to a point in time when the marker condition is satisfied; and extract the collected data that took place within a predetermined time range before and after the marker.

2. The vehicle diagnostic system according to claim 1, wherein the diagnostic device is further caused to collate the driving parameter associated with the selected symptom with the driving parameter included in the collected data, and set as the marker condition the judgment condition of the driving parameter for which a result of the collation matched.

3. The vehicle diagnostic system according to claim 1, wherein the diagnostic device is further caused to store the collected data extracted in an analysis file for each of the markers.

4. The vehicle diagnostic system according to claim 3, wherein the diagnostic device is further capable of independently setting the marker condition for each of the symptoms, and the diagnostic device is further caused to create an analysis file group classified for each of the symptoms.

5. The vehicle diagnostic system according to claim 1, wherein the diagnostic device is further caused to independently set respectively, within the predetermined time range, a time range before the marker and a time range after the marker.

6. A vehicle diagnostic method in which:

by a data collecting device detachably connected from an exterior to an in-vehicle network having a plurality of electronic control units, a data request signal for requesting driving parameter data indicative of operating states of respective components of a vehicle is transmitted to at least one target electronic control unit from among the plurality of electronic control units, the driving parameter data corresponding to the data request signal is received, and the driving parameter data is stored as collected data in association with a time axis; and by a diagnostic device, diagnosis of the vehicle is performed based on the collected data stored in the data collecting device;

wherein, using the diagnostic device, there are performed:

a storage step of, for each of symptoms to be diagnosed, storing beforehand a driving parameter related to the symptom, and a judgment condition of the driving parameter, in association with each other;

a marker condition setting step of selecting one from among the symptoms stored in the storage step, and setting a judgment condition of the driving parameter associated with the selected symptom as a marker condition for adding a marker to the time axis of the collected data;

a setting a final judgment parameter at which the judgment condition is determined lastly step, in an event that a plurality of the driving parameters are selected; and a satisfying of a judgment condition of the final judgment parameter step, after the judgment conditions of the driving parameters excluding the final judgment parameter from among the driving parameters included in the combination condition have been satisfied, is set as a condition by which the marker condition is satisfied;

a marking step of adding the marker to a point in time when the marker condition is satisfied; and a data extraction step of extracting the collected data that took place within a predetermined time range before and after the marker.

7. A vehicle diagnostic system comprising:

a vehicle diagnostic data collecting device configured to, in a state of being detachably connected from an exterior to an in-vehicle network having a plurality of electronic control units, transmit a data request signal for requesting driving parameter data indicative of operating states of respective components of a vehicle, to at least one target electronic control unit from among the plurality of electronic control units, receive the driving parameter data corresponding to the data request signal, and store the driving parameter data as collected data in association with a time axis; and a diagnostic device configured to perform a diagnosis of the vehicle based on the collected data stored in the data collecting device;

wherein the diagnostic device comprises a computation unit; and a storage unit including programs;

the storage unit and the programs configured to, with the computation unit, cause the diagnostic device at least to perform:

set a marker condition for adding a marker to the time axis of the collected data;

add the marker to a point in time when the marker condition is satisfied; and extract the collected data that took place within a predetermined time range before and after the marker, and store the collected data in an analysis file for each of the markers; and display driving parameters included in the collected data so as to enable selection thereof;

set a judgment condition for a driving parameter selected by the parameter selection unit;

in an event that a plurality of driving parameters are selected by the parameter selection unit, set a combination condition for the plurality of driving parameters;

set an upper limit number for number of the markers; and stop a process of adding the markers, in an event that the number of the markers added to the collected data has reached the upper limit number.

8. The vehicle diagnostic system according to claim 7, wherein the diagnostic device further comprises a time range setting unit configured to independently set respectively, within the predetermined time range, a time range before the marker and a time range after the marker.

9. The vehicle diagnostic system according to claim 7, wherein the diagnostic device is further caused to set a final judgment parameter at which the judgment condition is determined lastly, in an event that a plurality of the driving parameters are selected; and satisfaction of a judgment condition of the final judgment parameter, after the judgment conditions of the driving parameters excluding the final judgment parameter from among the driving parameters included in the combination condition have been satisfied, is set as a condition by which the marker condition is satisfied.

10. The vehicle diagnostic system according to claim 7, wherein the diagnostic device is further caused to store combination information of the driving parameters as a diagnostic set, for each of symptoms of the vehicle to be diagnosed;

display and select an identification name of the diagnostic set; and extract from the analysis file the driving parameter data corresponding to the selected diagnostic set, and display the driving parameter data on a display unit.

11. A vehicle diagnostic system comprising:

a vehicle diagnostic data collecting device configured to, in a state of being detachably connected from an exterior to an in-vehicle network having a plurality of electronic control units, transmit a data request signal for requesting driving parameter data indicative of operating states of respective components of a vehicle, to at least one target electronic control unit from among the plurality of electronic control units, receive the driving parameter data corresponding to the data request signal, and store the driving parameter data as collected data in association with a time axis; and a diagnostic device configured to perform a diagnosis of the vehicle based on the collected data stored in the data collecting device;

wherein the diagnostic device comprises:

a computation unit; and a storage unit including programs;

the storage unit and the programs configured to, with the computation unit, cause the diagnostic device at least to perform:

set a marker condition for adding a marker to the time axis of the collected data;

add the marker to a point in time when the marker condition is satisfied; and extract the collected data that took place within a predetermined time range before and after the marker, and store the collected data in an analysis file for each of the markers; and display driving parameters included in the collected data so as to enable selection thereof;

set a judgment condition for a driving parameter selected by the parameter selection unit;

in an event that a plurality of driving parameters are selected by the parameter selection unit, set a combination condition for the plurality of driving parameters;

set a final judgment parameter at which the judgment condition is determined lastly, in an event that a plurality of the driving parameters are selected; and satisfaction of a judgment condition of the final judgment parameter, after the judgment conditions of the driving parameters excluding the final judgment parameter from among the driving parameters included in the combination condition have been satisfied, is set as a condition by which the marker condition is satisfied.

12. The vehicle diagnostic system according to claim 11, wherein the diagnostic device further comprises a time range setting unit configured to independently set respectively, within the predetermined time range, a time range before the marker and a time range after the marker.

13. The vehicle diagnostic system according to claim 11, wherein the diagnostic device is further caused to store combination information of the driving parameters as a diagnostic set, for each of symptoms of the vehicle to be diagnosed;

display and select an identification name of the diagnostic set; and extract from the analysis file the driving parameter data corresponding to the selected diagnostic set, and display the driving parameter data on a display unit.

* * * * *